United States Patent
Ihara

(10) Patent No.: US 6,894,734 B1
(45) Date of Patent: May 17, 2005

(54) LIQUID-CRYSTAL DISPLAY DEVICE AND METHOD FOR PRODUCTION THEREOF

(75) Inventor: Hirofumi Ihara, Tokyo (JP)

(73) Assignee: NEC LCD Technologies, Ltd., Kawasaki (JP)

( * ) Notice: Subject to any disclaimer, the term of this patent is extended or adjusted under 35 U.S.C. 154(b) by 0 days.

(21) Appl. No.: 09/498,064

(22) Filed: Feb. 4, 2000

(30) Foreign Application Priority Data

Feb. 5, 1999 (JP) .......................................... 11-029367

(51) Int. Cl.[7] .......................................... G02F 1/1343
(52) U.S. Cl. .......................................... 349/38; 349/39
(58) Field of Search .............................. 349/38, 39, 40, 349/41, 42, 43, 138

(56) References Cited

U.S. PATENT DOCUMENTS

| | | | | |
|---|---|---|---|---|
| 5,917,563 A | * | 6/1999 | Matsushima | 349/38 |
| 6,011,274 A | * | 1/2000 | Gu et al. | 257/59 |
| 6,091,464 A | * | 7/2000 | Song | 349/38 |
| 6,118,506 A | * | 9/2000 | Yamazaki et al. | 349/111 |
| 6,184,945 B1 | * | 2/2001 | Sung | 349/38 |

FOREIGN PATENT DOCUMENTS

| | | |
|---|---|---|
| JP | 1-140129 | 6/1989 |
| JP | 3-294824 | 12/1991 |
| JP | 4-174822 | 6/1992 |
| JP | 4-288529 | 10/1992 |
| JP | 4-326329 | 11/1992 |
| JP | 4-335617 | 11/1992 |
| JP | 5-2189 | 1/1993 |
| JP | 5-297410 | 11/1993 |
| JP | 6-18922 | 1/1994 |
| JP | 6-160900 | 6/1994 |
| JP | 10-48664 | 2/1998 |
| JP | 10-123567 | 5/1998 |
| JP | 10-161150 | 6/1998 |
| JP | 10-177163 | 6/1998 |

OTHER PUBLICATIONS

Korean Office Action dated Feb. 28, 2002, with partial English translation.

Japanese Office Action, dated Aug. 8, 2000, with partial English translation.

* cited by examiner

Primary Examiner—Robert H. Kim
Assistant Examiner—David Y. Chung
(74) Attorney, Agent, or Firm—McGinn & Gibb, PLLC

(57) ABSTRACT

A liquid-crystal display device is provided wherein large electrostatic capacitance can be obtained without exposure of a metal film on a surface of a TFT array substrate, and yield in production and stability in images are improved. In the liquid-crystal display device of the present invention, a thin-film transistor section is mounted which is used to selectively connect either of a data wiring formed on a gate insulating film or a transparent electrode by a gate connected to an address wiring placed in each of picture element areas. In each of picture element areas, a capacitor section is formed with a first electrode formed, on the gate insulating film, using the same conductive film as used for the data wiring and a second electrode formed, on an upper layer insulating film formed on the gate insulating film, using the same transparent conductive film as used for a transparent electrode.

32 Claims, 32 Drawing Sheets

LIQUID-CRYSTAL DISPLAY DEVICE AND METHOD FOR PRODUCTION THEREOF

BACKGROUND OF THE INVENTION

1. Field of the Invention

The present invention relates to a thin-film transistor (TFT)-type liquid-crystal display device and more particularly to the TFT-type liquid-crystal display device having an improved capacitor section and to a method for manufacturing the same.

2. Description of the Related Art

An active matrix-type liquid-crystal display device employing a TFT as a switching device is so configured that a TFT array substrate on which the TFTs and picture element electrodes are mounted in a matrix form is placed, through a liquid-crystal, facing a color filter substrate on which a light-intercepting film (so called a "black matrix"), a coloring layer and a common electrode are formed.

FIG. 34 is a schematic equivalent circuit diagram showing a conventional liquid-crystal display device described above. In FIG. 34, address wiring 11 constitutes a scanning line driven by an address wiring driver (not shown) connected to a gate terminal 301, data wiring 12 constitutes a signal line driven by a data wiring driver (not shown) connected to a drain terminal 302, a reference numeral 103 denotes a thin-film transistor section with its gate connected to the address wiring 11 and with its drain connected to the data wiring 12 and a reference numeral 6 denotes a transparent electrode which is connected to the thin-film transistor section 103 and is formed with a transparent conductive film composed of ITO (indium tin oxide) or the like. An area encircled by a broken line shows a TFT array substrate 100 and a color filter substrate 200 and these two substrates facing each other are mounted through the liquid-crystal.

To a source of the thin-film transistor section 103 are in parallel connected a capacitor section 105 and a liquid-crystal capacitor section 310. The capacitor section 105 is a capacitive device composed of the transparent electrode 6 and of an accumulative capacitive electrode disposed through an insulating film below the transparent electrode 6. The liquid-crystal capacitor section 310 is a capacitive device composed of the transparent electrode 6 and of another electrode (not shown) facing on the color filter substrate 200 disposed through the liquid-crystal. This causes a voltage inputted from a common potential inputting terminal 303 mounted on the TFT array substrate 100 to be supplied by a transfer pad (not shown) through the transfer device 304 to the facing electrode (not shown).

In the liquid-crystal display device in FIG. 34, selecting pulses are sequentially applied by the address wiring driver to the address wiring 11. When the selecting pulse is applied to any of address wiring 11, all the thin-film transistor sections 103 connected to the address wiring 11 become conductive only for the period while the selecting pulse is being applied. At this point, the transparent electrode 6 connected to the source of the thin-film transistor section 103 is charged to a signal voltage which has been applied to the data wiring 12. After that, when non-selecting pulse is applied to the address wiring 11, though the thin-film transistor section 103 which has been in a conductive state is then turned OFF, the transparent electrode 6 still continues holding a charged voltage. The voltage being held, when any corresponding thin-film transistor section 103 becomes conductive, becomes rewritten by a subsequent voltage.

In order for a liquid-crystal display device using the TFT array substrate 100 to perform its displaying having high quality, it is necessary for the picture element electrode to be able to hold the charged voltage until its subsequent writing is complete. If the voltage being held is decreased, inconsistencies occur in images displayed, causing the images not to be sharp. However, since the charged voltage of the transparent electrode 6 leaks through the thin-film transistor section 103, the voltage being held gradually decreases. It is therefore necessary to increase capacitance of the transparent electrode 6, i.e., electrostatic capacitance of the liquid-crystal capacitor section 310 or the capacitor section 105.

In the conventional TFT-type array substrate as shown in FIGS. 30A and 30B, a plurality of address wiring 11 is formed on an insulating substrate 101, on which a gate insulating film 5 is grown and further on which a plurality of data wiring 12 is formed in such a manner that the data wiring 12 and the address wiring 11 cross each other. In each of the picture element areas 102 surrounded by the address wiring 11 and the data wiring 12, the transparent electrode 6 composed of transparent conductive films is formed. Also, in the thin-film transistor section 103 of each of the picture element area 102, the gate 11a connected to the address wiring 11 is adapted to selectively connect either of the data wiring 12 and the transparent electrode 6.

The transparent electrode 6, since its charged voltage is held until it is rewritten by the subsequent data signal, is adapted to constitute a capacitor section 105 allowing electrostatic capacitance to be accumulated between the transparent electrode 6 and the address wiring 11. As shown in FIG. 23B, the capacitor section 105 is so configured that a part of the address wiring 11 faces a part of the transparent electrode 6 through the gate insulating film 5 formed on the address wiring 11 and an upper layer insulating film 8 grown on the gate insulating film 5.

According to the conventional method, in the capacitor section 105, since a dielectric layer between the address wiring 11 and the transparent electrode 6 is thick, electrostatic capacitance per area is small accordingly. Therefore, in order to increase the capacitance, a part of the address wiring 11 is extended to an image section and the area facing the transparent electrode 6 is increased. However, in the case of a light-transmission type liquid-crystal display device in particular, if the part of the address wiring 11 is extended to the image section, an amount of light passing through the image section is decreased, thus resulting in poor lighting on a screen. Accordingly, a new method is needed for increasing the electrostatic capacitance without increasing the area of the capacitor section 105. In Japanese Laid-open Patent Application No. Hei5-2189, a configuration of a conventional picture element area is disclosed as shown in FIG. 31. In this configuration, the gate 11a connected to the address wiring 11 and an auxiliary capacitive common wiring 24 disposed separately from the address wiring 11 are formed on the insulating substrate 101, on which $SiO_2$ films 32 are grown and, at the thin-film transistor section 103, on the $SiO_2$ films 32 are formed a silicon nitride film 33 and an amorphous silicon film 34. After that, on the first $SiO_2$ films 32 is formed the transparent electrode 6 composed of ITO, on which the silicon nitride film 33 is grown. At this point, the silicon nitride film 35 is left on the transparent electrode 6. Next, a source electrode 36a and a drain electrode 36b to be connected via a through hole to the transparent electrode 6 are formed with a second metal material such as Cr/Al and the like and an upper auxiliary electrode 36c to be connected via a through hole to the auxiliary capacitive common wiring 24 is formed with the same second metal materials as well.

According to configurations described above, since electrostatic capacitance is generated in parallel between the transparent electrode 6 and the auxiliary capacitive common wiring 24 and between the transparent electrode 6 and the upper auxiliary electrode 36c, it becomes possible to increase the area effectiveness of the capacitor section 105. However, such conventional technologies have various problems as described below. That is, since configurations of the liquid-crystal display device as disclosed above are more complex than those of conventional ones and its manufacturing processes increase greatly in number, thus resulting in poor productivity of the liquid-crystal display device. Since the source electrode 36a, drain electrode 36b and upper auxiliary electrode 36c, which are all composed of metal materials such as Cr/Al or the like, are exposed on the surface of the TFT array substrate, while application of polyimide and treatment of orientation are being performed at next processes or while the device is being stored before next processes start, such malfunctions as adsorption of water into the metal surface and/or dissolution of the upper auxiliary electrode 36c or of the electrode of the thin-film transistor section 103 occur, thus presenting a problem in reliability of the liquid-crystal display device. Furthermore, since the metal film constituting the upper auxiliary electrode 36c is used as the data wiring, its thickness should be large in order to lower the wiring resistance, i.e., the thickness of the metal film is 10 times larger than that of the transparent electrode 6 (made of ITO). Therefore, if the upper auxiliary electrode 36c is exposed, big steps occur on the surface, causing a loss of flatness in the polyimide film formed on the surface of the TFT array substrate. Because of this, at the area where these steps occur, the image quality is degraded. Additionally, there are other problems in that, as the metal film has a poor wettability to polyimide, voids occur between the data wiring/upper auxiliary electrode 36c and the polyimide film or the data wiring/upper auxiliary electrode 36c peel from the polyimide film.

A method for forming the TFT array substrate with the metal film being unexposed is disclosed in Japanese Laid-open Patent Application No. 10-48664 as shown in FIG. 32, which shows a cross-sectional view of a picture element area in a liquid-crystal display device and in FIG. 33, which shows a cross-sectional view of the picture element area taken on line J-K in FIG. 32. In FIGS. 32 and 33, address wiring 11 and an auxiliary capacitive common electrode 41 are formed on an insulating substrate 101, on which the gate insulating film 5 is formed. On the gate insulating film 5, in the thin-film transistor section 103, a source electrode 4 and a drain electrode 3 are formed. At a capacitor section 105, by using a same metal film, a storage electrode 42 is formed, on which the upper layer insulating film 8 to cover the thin-film transistor section 103, an image section 104 and the capacitor section 105 are grown. Next, in the image section 104 and the capacitor section 105, the transparent electrode 6 is formed. The transparent electrode 6 is connected via a through hole 8a to the source electrode 4 and via a through hole 8b to the storage electrode 42.

According to the method described above, since a surface of the TFT array substrate 300 is covered with the transparent electrode 6 composed of ITO and the upper layer insulating film 8, both of which can be stable in processing of a liquid-crystal system, the problem caused by the exposure of the metal film is solved. However, because the capacitor section 105 formed by the above configurations is composed of the auxiliary capacitive common electrode 41, gate insulating film 5 and storage electrode 42, a thickness of a dielectric layer and a dielectric constant are limited if desired electric characteristics of the thin-film transistor section 103 must be obtained, and an area of the electrode is increased if electrostatic capacity must be increased. As a result, an effective aperture ratio of the image section 104 is decreased and the display image is poorly lit. If the intensity of a back light is raised to make the display image well lit, power consumption is increased as a result. If a screen having larger numbers of picture elements must be obtained in particular, since an area per one picture element is made smaller, the reduction of the aperture ratio becomes remarkable.

SUMMARY OF THE INVENTION

In view of the above, it is an object of the present invention to provide a liquid-crystal display device and a method for producing the same wherein, without reduction of an aperture ratio in a picture element area and without exposure of a metal film on a surface of a TFT array substrate, high electrostatic capacitance can be obtained and yield in production and stability in an image can be improved.

According to a first aspect of the present invention, there is provided a liquid-crystal display device comprising:

a plurality of address wiring formed on an insulating substrate;

a gate insulating film formed on the address wiring;

a plurality of data wiring formed in a manner that the data wiring and the address wiring cross each other;

an upper layer insulating film grown on the data wiring;

a transparent electrode, composed of a transparent conductive film, formed on the upper layer insulating film and placed in each of picture element areas surrounded by the address wiring and the data wiring;

a thin-film transistor section, disposed in each of picture element areas, used to selectively connect the data wiring with the transparent electrode by a gate connected to the address wiring; and a capacitor section, disposed in each of picture element areas, composed of a first electrode formed on the gate insulating film using the same conductive film as used for the data wiring, a second electrode formed on the upper layer insulating film using the same transparent conductive film as used for the transparent electrode and the upper layer insulating film. In the liquid-crystal display device described above, since the capacitor section is formed through the upper layer insulating film between the first electrode and the second electrode, a thickness of or material for the upper layer insulating film can be selected independently of the gate insulating film and by adjusting the thickness or a dielectric constant of the upper layer insulating film, the capacitor section having a desired electrostatic capacitance can be formed without extension of the area. Moreover, since the liquid-crystal display device is so configured that the first electrode composed of a metal film is not exposed on a surface of the capacitor section, unlike in the case of the conventional liquid-crystal display device in which the metal electrode is exposed on the surface of the capacitor section, various failures that may occur in next processes including application of polyimide and treatment of its orientation can be prevented. In the liquid-crystal display device according to this first aspect of the present invention, though the transparent electrode and the second electrode composed of the same transparent conductive film as used for the transparent electrode are exposed on the surface of the capacitor section, the transparent conductive film made of, for example, ITO does not present any problem in next processes including the application of polyimide and treatment of its orientation.

In the foregoing, a preferable mode is one wherein the second electrode is formed with an extended part of the transparent electrode. In this case, since the transparent electrode is connected to a source electrode in the thin-film transistor section, if the first electrode is connected to the auxiliary capacitive common wiring, the electrostatic capacitance can be accumulated between the transparent electrode extending in the capacitor section and the first electrode.

Also, a preferable mode is one wherein the first electrode is connected to the address wiring using the same transparent conductive film as used for the transparent electrode.

Also, a preferable mode is one wherein the first electrode is connected to the address wiring using the same conductive film as used for the data wiring. When the first electrode is connected to the address wiring, since the address wiring can serve commonly as the auxiliary capacitive common wiring, the first electrode holds a common reference potential and the second electrode holds a liquid-crystal driving potential. Moreover, when connections between the first electrode and the address wiring are made using the same transparent conductive film as used for the transparent electrode, there is an advantage that the number of processes is not increased. When connections between the first electrode and the address wiring are made using the same conductive film as used for the data wiring, since the connecting portion is formed in a layer being different from a layer of the transparent electrode, there is no risk of short-circuit between the connecting portion and the transparent electrode. Furthermore, because a connecting distance between the first electrode and the address wiring is made shorter, a possibility of breakage in the connecting portion is reduced, thus improving reliability.

Also, a preferable mode is one wherein a part of the capacitor section is formed in a manner that it is superimposed through the gate insulating film on the address wiring.

Also, a preferable mode is one wherein a width of the address wiring is constant in the picture element area and wherein the capacitor section is formed in a manner that the whole of it is superimposed through the gate insulating film on the address wiring. Since most of the address wiring is housed within a black matrix, the capacitor section is mounted in a manner that, at least, a part of the capacitor section is superimposed on the address wiring which means that, at least, a part of the capacitor section is housed in the black matrix, which serves to improve the aperture ratio or light transmission rate in the picture element area. Especially, if the width of the address wiring is constant in the picture element area of the liquid-crystal display device and the whole of the capacitor is superimposed within the width, it is possible to house the whole capacitor section into the black matrix, thus avoiding the extension of the capacitor section in the picture element area and maximizing the aperture ratio and, in the case of the light-transmission type liquid-crystal display device, a decrease in the light transmission rate caused by the capacitor section can be prevented.

Also, a preferable mode is one wherein the whole of the thin-film transistor section and of data wiring is covered with the upper layer insulating film or the transparent conductive film. In this case, since a whole surface of an image forming section of the TFT array substrate is covered with the upper layer insulating film or the transparent conductive film, various malfunctions that may occur during next processes including the application of polyimide and treatment of its orientation or during storage process can be prevented.

Also, a preferable mode is one wherein the upper layer insulating film is thinner than that of the gate insulating film or a dielectric constant of the upper layer insulating film is larger than that of the gate insulating film. This allows the capacitor section having larger electrostatic capacitance per area compared with the case of the conventional liquid-crystal device using the gate insulating film as a dielectric layer in the capacitor section. If the value of capacitance is the same, the aperture ratio can be improved.

Also, a preferable mode is one wherein the upper layer insulating film is a complex film composed of a plurality of insulating films. Since the dielectric constant of the insulating film and a degree of roughness and fineness of the structure of the insulating film vary depending on its material, even if its dielectric constant is high, when its structure is rough, a problem in reliability occurs in some cases. Moreover, its forming method becomes easy or difficult depending on cases. Therefore, by using the complex film selectively containing two or more insulating films having excellent properties, the capacitor section having high dielectric constant and high reliability can be obtained.

Also, a preferable mode is one wherein the upper layer insulating film is composed of, at least, one kind of a silicon nitride film, silicon oxide film and metal oxide film. The silicon nitride film is conventionally used as a passivation film for the thin-film transistor and has high dielectric constant. Since the silicon oxide film can be formed densely or finely, it is suitable for combined use with the silicon nitride film. The metal oxide film has a merit in that it can be formed easily by performing oxidization treatment on a metal layer of the first electrode.

Also, a preferable mode is one wherein the auxiliary capacitive common wiring is formed in parallel to the address wiring and wherein the capacitor section is formed in a manner that it is partially or totally superimposed on the auxiliary capacitive common wiring. When the auxiliary capacitive common wiring is formed in parallel to the address wiring, since it can supply a common potential to the capacitor section, stable electrostatic capacitance can be accumulated in the capacitor section. Moreover, when the capacitor section is superimposed on the auxiliary capacitive common wiring, reduction in amounts of transmitted light caused by the capacitor section crossing the picture element area can be minimized in the light transmission-type liquid-crystal display device.

Also, a preferable mode is one wherein connections are made at, at least, two points between the first electrode and the address wiring or between the first electrode and the auxiliary capacitive common wiring. In this case, even if a connection failure occurs at either of connecting points, or if a malfunction such as cracks occurs in the address wiring or the auxiliary capacitive common wiring between the connecting points during processes, since the continuity is ensured, thus improving yield and reliability in production. Also, since the first electrode is connected in parallel to the address wiring or the auxiliary capacitive common wiring, wiring resistance can be reduced.

Also, a preferable mode is one wherein the capacitor section is formed by connecting, in parallel, a first capacitive component composed of a part of the address wiring, the first electrode and the gate insulating film put between the address wiring and the first electrode with a second capacitive component composed of the first electrode, the second electrode and the upper layer insulating film put between the first electrode and the second electrode. According to this configuration, since the electrostatic capacitance can be accumulated on both sides of the first electrode with the second electrode composed of the transparent conductive film being exposed on the surface of the TFT array, unlike in the case of the conventional liquid-crystal device in which the metal film is exposed on the surface, without the exposure of the metal film on the TFT array surface, the electrostatic capacitance per area can be greatly increased in the capacitor section. Especially, even if the aperture ratio is maximized without the increase in width of the address wiring or the auxiliary capacitive common wiring, since large electrostatic capacitance can be obtained, no degradation of image quality occurs.

According to a second aspect of the present invention, there is provided a method for producing the liquid-crystal display device stated in the first aspect, comprising the steps of:

forming a plurality of address wiring on an insulating substrate;

forming a gate insulating film on the address wiring;

forming a plurality of data wiring on the gate insulating film in a manner that the data wiring and address wiring cross each other;

forming a thin-film transistor used to selectively connect the data wiring with said transparent electrode disposed in each of picture element areas by a gate connected to the address wiring, in each of picture element areas surrounded by the address wiring and data wiring;

forming a first electrode using the same conductive film as used for the data wiring;

forming an upper layer insulating film on the first electrode;

forming a second electrode using the same transparent conductive film as used for the transparent electrode; and forming the capacitor section using the first electrode, the second electrode and the upper layer insulating film. According to this method, the liquid-crystal display device having large electrostatic capacitance with no metal film exposed on the surface of the TFT array can be manufactured readily within processes used for the conventional one without the need for additional processes or production equipment.

In the foregoing, it is preferable that the second electrode is formed with an extended part of the transparent electrode in said capacitor section.

Also, it is preferable that the first electrode is connected to the address wiring using the same transparent conductive film as used for the transparent electrode.

Also, it is preferable that the first electrode is connected to the address wiring using the same conductive film used for the data wiring.

According to a third aspect of the present invention, there is provided a method for producing the liquid-crystal display device stated in the tenth preferable mode related to the first aspect of the present invention, comprising the steps of:

forming a plurality of address wiring on an insulating substrate;

forming a plurality of auxiliary capacitive common wiring in a manner that it is disposed in parallel to the address wiring;

forming a gate insulating film on the auxiliary capacitive common wiring;

forming a plurality of data wiring on the gate insulating film in a manner that the address wiring and data wiring cross each other;

forming a thin-film transistor used to selectively connect the data wiring with the transparent electrode disposed in each of picture element areas by a gate connected to the address wiring, in each of picture element areas surrounded by the address wiring and data wiring;

forming said first electrode using the same conductive film as used for the data wiring;

forming the upper insulating film on the first electrode;

forming the second electrode using the same transparent conductive film as used for the transparent electrode; and forming the capacitor section using the first electrode, the second electrode and the upper layer insulating film in a manner that the capacitor is partially or totally superimposed on the auxiliary capacitive common wiring.

In the foregoing, it is preferable that the first electrode is connected to the transparent electrode and the second electrode is connected to the address wiring and wherein the capacitor section is mounted in a manner that it is superimposed on a part of the address wiring.

According to a fourth aspect of the present invention, there is provided a method for producing the liquid-crystal display device stated in the third preferable mode related to the first aspect of the present invention, comprising the steps of:

forming a plurality of address wiring on an insulating substrate;

forming a gate insulating film on the address wiring;

forming, in the gate insulating film, a through hole which reaches the address wiring;

forming a plurality of data wiring on the gate insulating film in a manner that the address wiring and data wiring cross each other;

forming a thin-film transistor used to selectively connect the data wiring with the transparent electrode disposed in each of picture element areas by a gate connected to the address wiring, in each of picture element areas surrounded by the address wiring and data wiring;

forming the first electrode using the same conductive film used for the data wiring;

connecting the first electrode to the address wiring via the through hole formed in the gate insulating film;

forming the upper layer insulating film on the first electrode; and forming the second electrode using the same transparent conductive film as used for the transparent electrode; and forming the capacitor section using the first electrode, the second electrode and the upper layer insulating film.

BRIEF DESCRIPTION OF THE DRAWINGS

The above and other objects, advantages and features of the present invention will be more apparent from the following description taken in conjunction with the accompanying drawings in which.

DETAILED DESCRIPTION OF THE PREFERRED EMBODIMENTS

Figure 31:
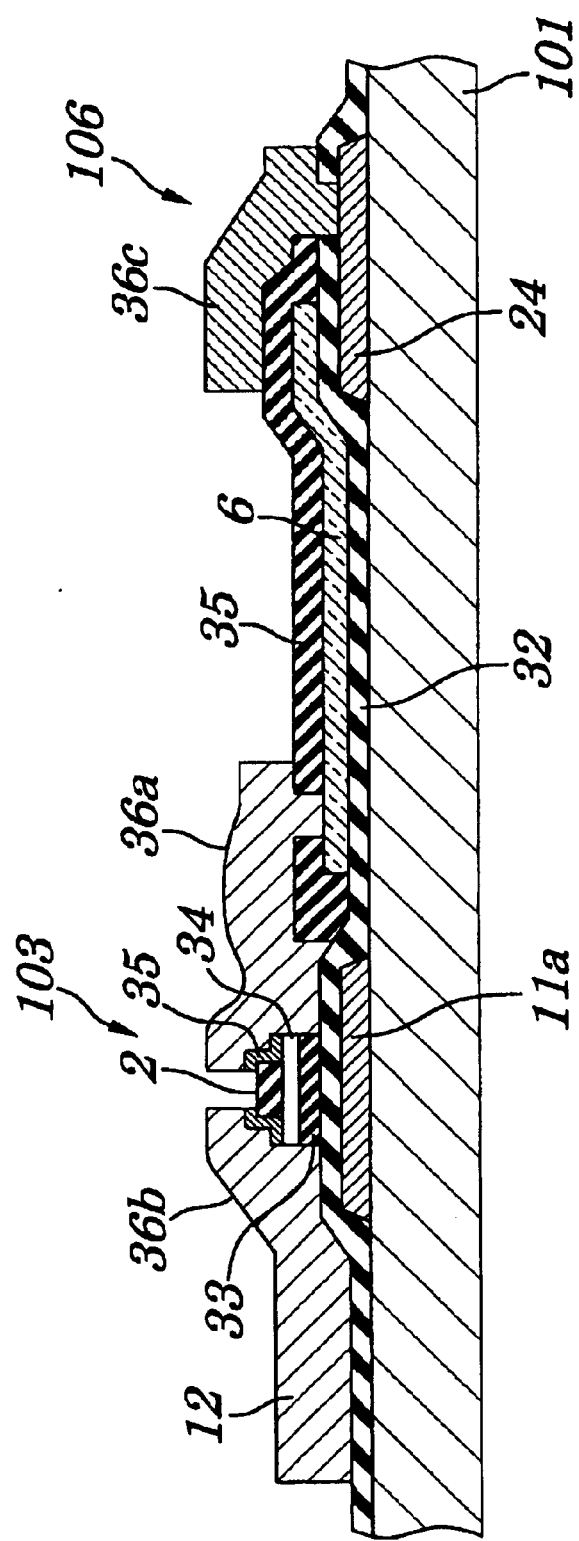
FIG. 31 is a cross-sectional view of a picture element area of another conventional liquid-crystal display device.
Figure 32:
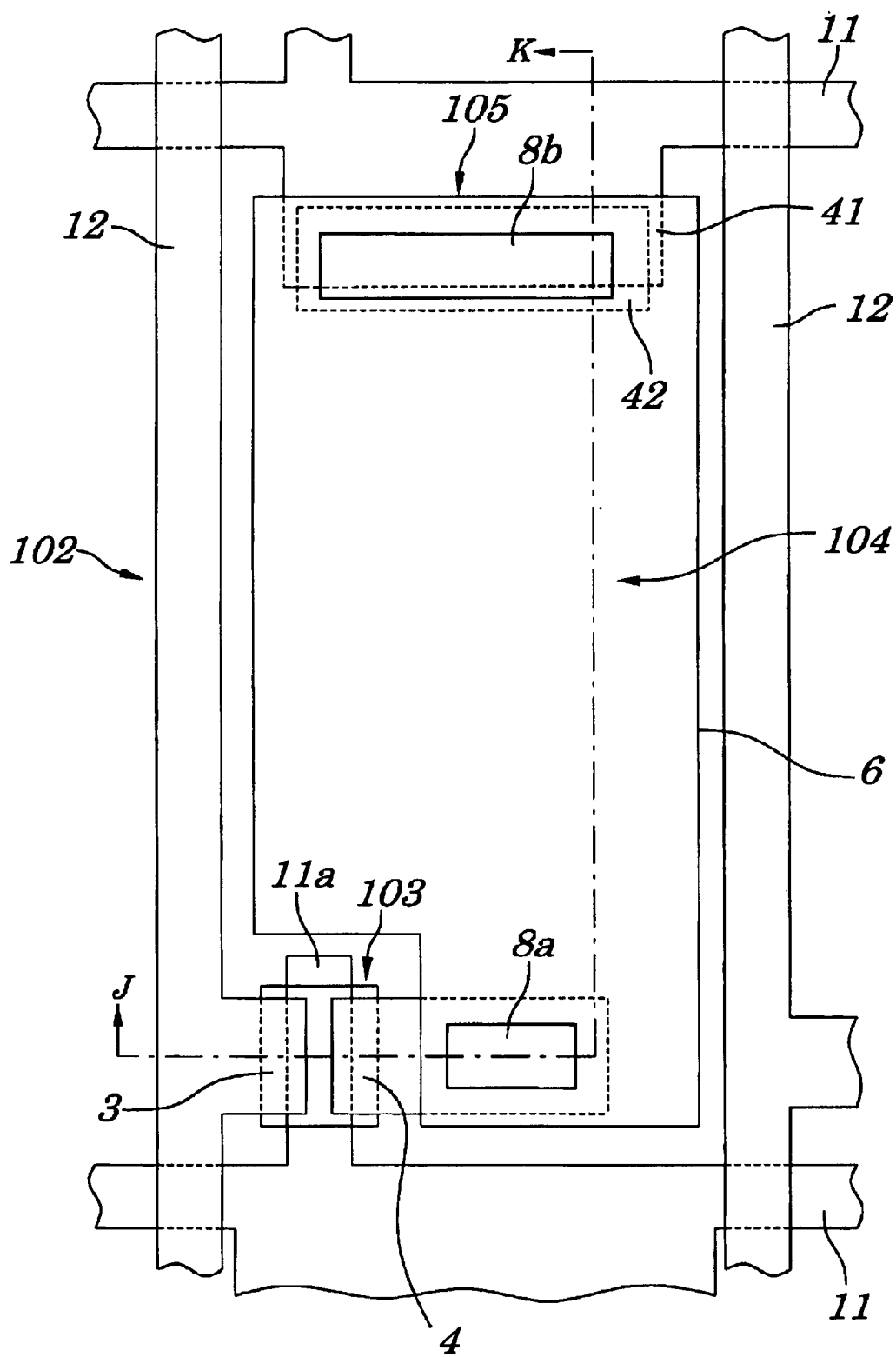
FIG. 32 is a cross-sectional view of a picture element area of further another conventional liquid-crystal display device.
Figure 33:
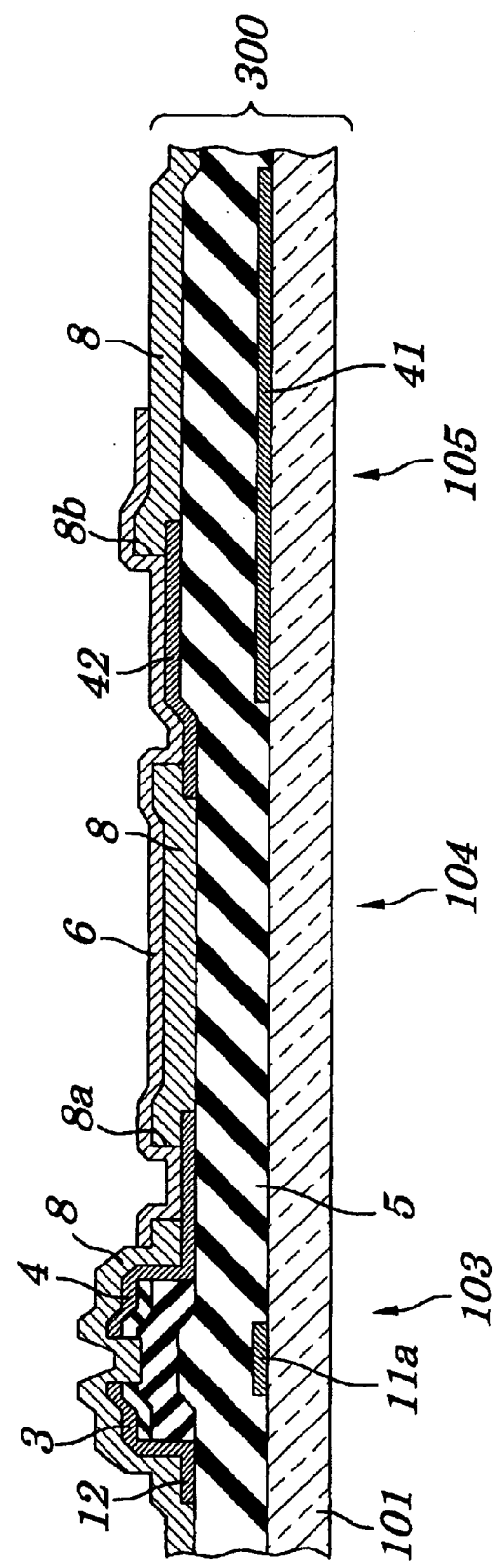
FIG. 33 is a cross-sectional view of the picture element area taken on line J–K in FIG. 32.
Figure 34:
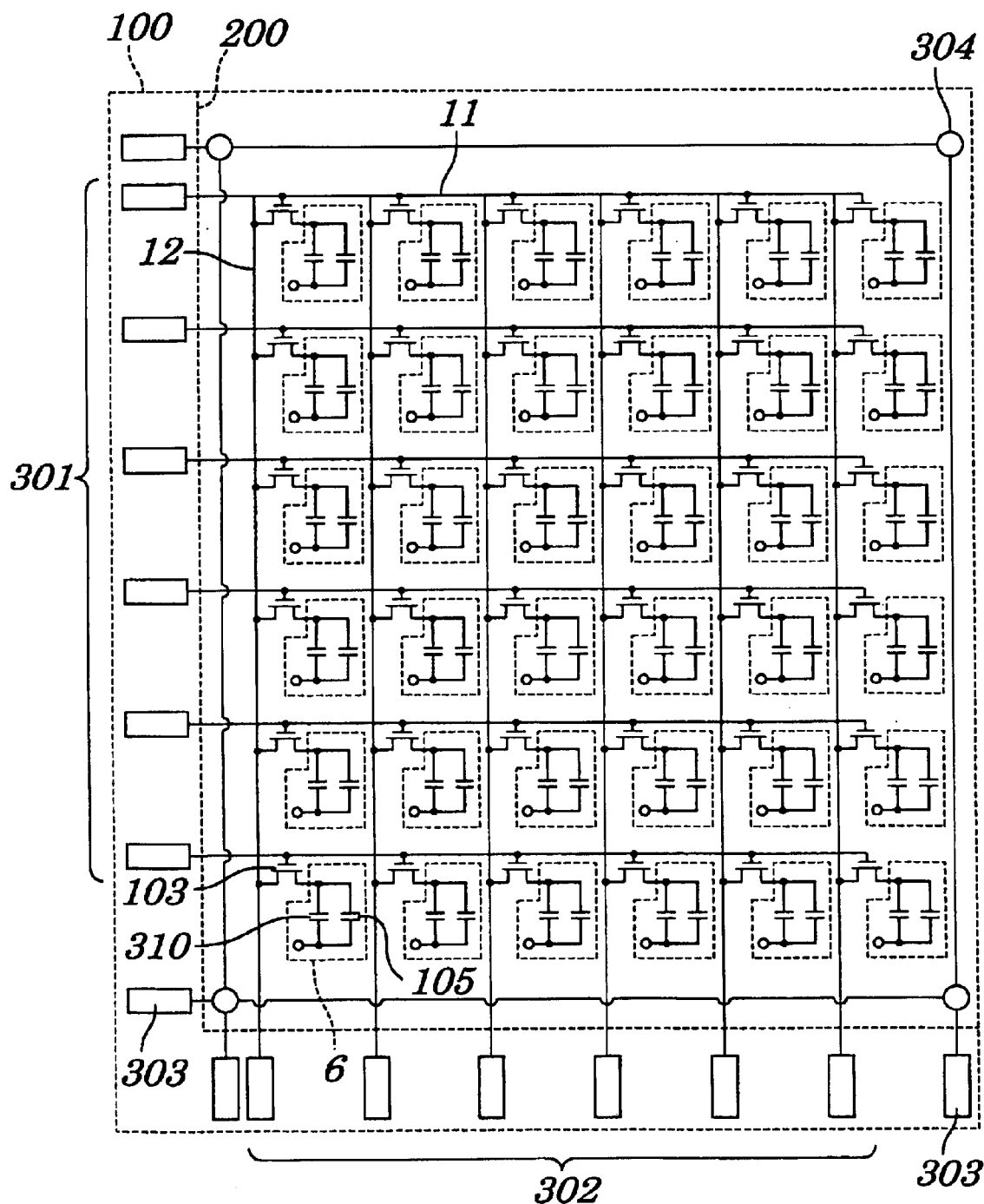
FIG. 34 is a schematic equivalent circuit diagram showing a conventional liquid-crystal display device.

Best modes of carrying out the present invention will be described in further detail using various embodiments with reference to the accompanying drawings. In the following descriptions of various embodiments of the present invention, any component or part having the same configurations or functions as those in the conventional liquid-crystal display device shown in FIGS. 31 and 34 are assigned the same reference numeral and descriptions of some of them are omitted accordingly.

First Embodiment

Figure 1:
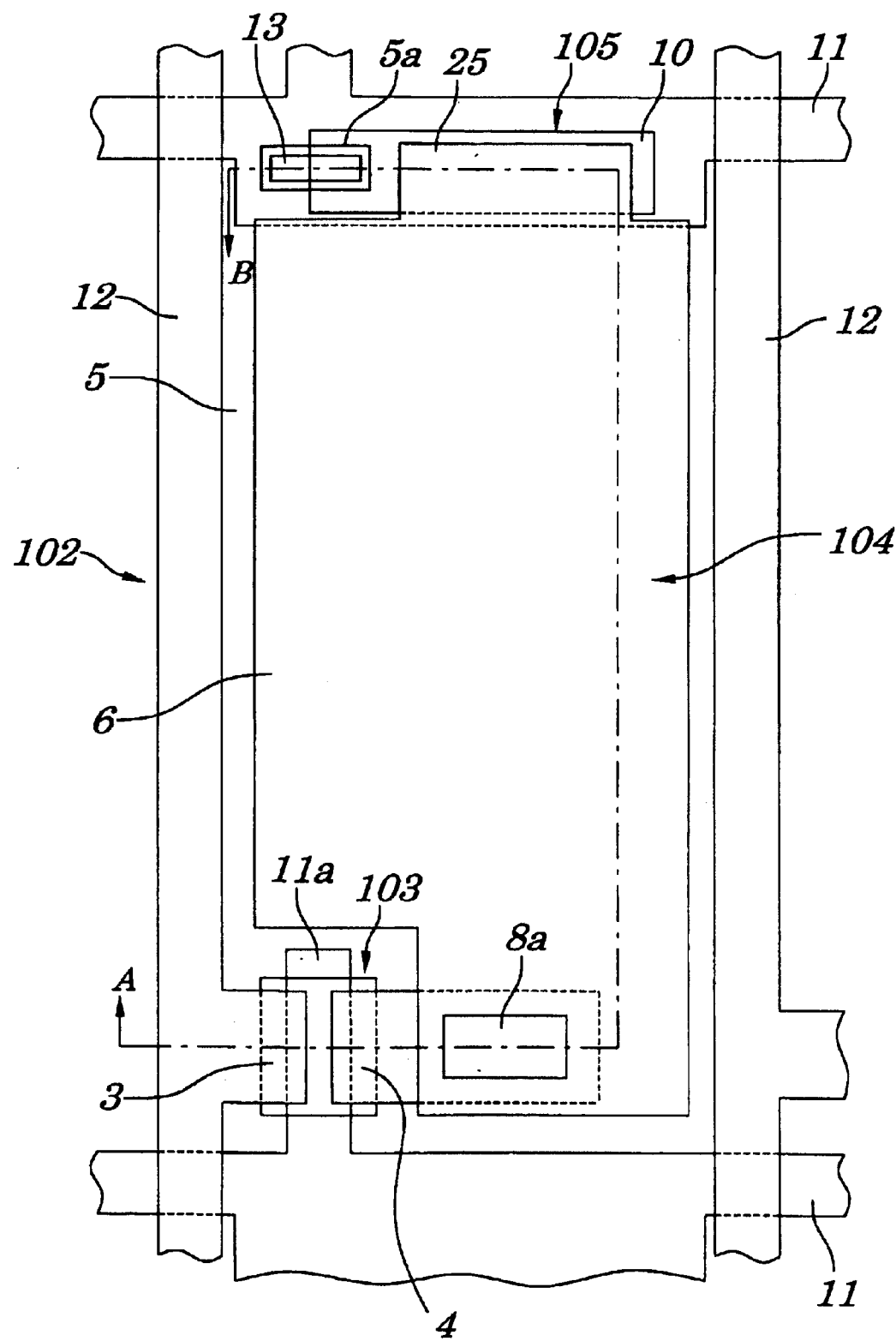
FIG. 1 is a plan view of a picture element area of a liquid-crystal display device according to a first embodiment.
Figure 2:
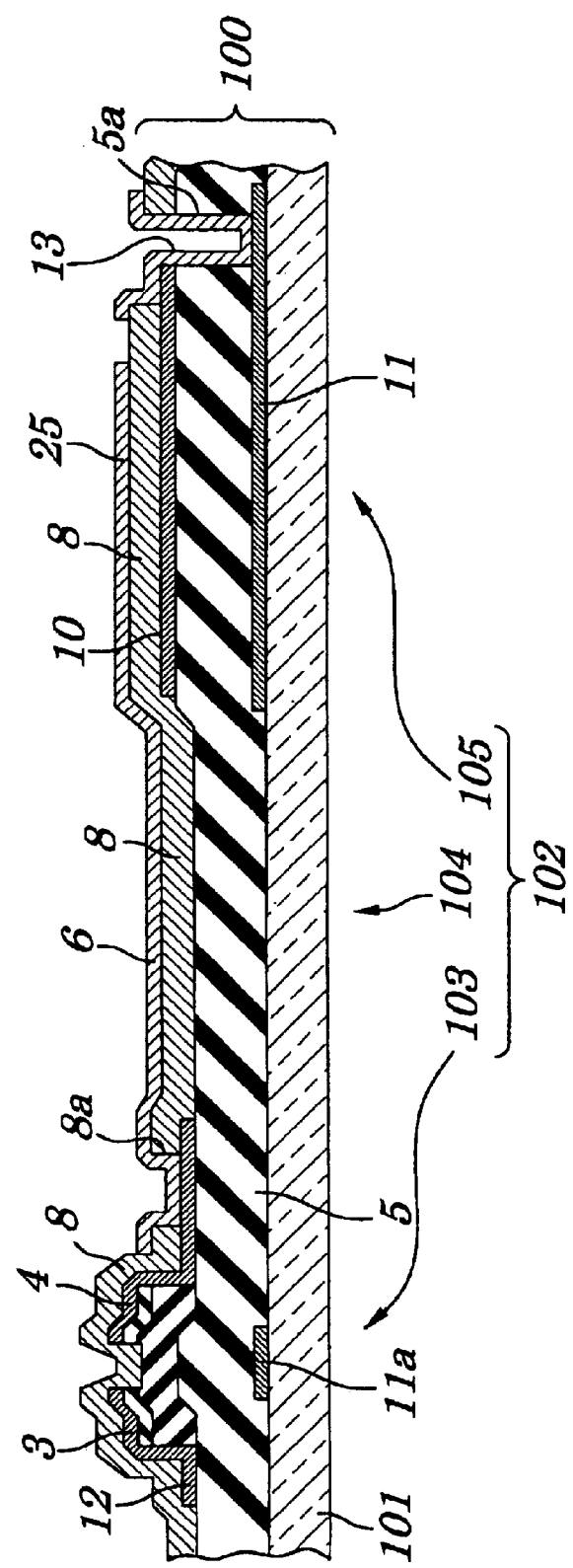
FIG. 2 is a cross-sectional view of the element area taken on line A–B in FIG. 1.

FIG. 1 is a plan view of a picture element area of a TFT array substrate in a liquid-crystal display device according to a first embodiment. FIG. 2 is a cross-sectional view of the thin-film transistor section 103, image section 104 and capacitor section 105 taken on line A–B in FIG. 2.

As shown in FIGS. 1 and 2, in the liquid-crystal display device according to the first embodiment, on the insulating substrate 101 composed of transparent glass is arranged a plurality of address wiring 11, 11, . . . in parallel, on which the gate insulating film 5 composed of silicon oxide. On the gate insulating film 5 is arranged a plurality of data wiring 12, 12, . . . in parallel in a manner that the address wiring 11 and the data wiring cross each other. The above-described components including the transparent electrode 6 constitute the picture element area 102. In each of the picture element areas, the thin-film transistor section 103, the image section 104 and the capacitor section 105 are mounted. In this embodiment, the address wiring 11 and the data wiring 12 are composed of a conductive film made of Cr (Chromium), however, the conductive film maybe made of Ti (Titanium), Al (Aluminium), W (Tungsten), Mo (Molybdenum), Ta (Tantalum) or the like, or a stacked film thereof or an alloying film thereof.

In each of the picture element areas 102, on the gate insulating film 5 is mounted the thin-film transistor section 103 adapted to selectively connect either of the data wiring 12 or the transparent electrode 6 by using the gate 11a extending from the address wiring 11. Also, in each of the picture element areas 102, a first electrode 10 is formed using the same the conductive film made of Cr as used for the data wiring 11. Moreover, on the gate insulating film 5 is formed the upper layer insulating film 8 which covers the data wiring 12, thin-film transistor section 103, image section 104 and first electrode 10, on which the transparent electrode 6 connected to the first electrode 10 and extending through the image section 104 and the upper layer insulating film 8 are formed. According to this embodiment, the upper layer insulating film 8 is a silicon nitride film which is thinner than that of the gate insulating film 5, and the transparent electrode 6 is composed of ITO. The transparent electrode 6 extending on the first electrode 10 also constitutes a second electrode 25 and a portion where the first electrode 10, upper layer insulating film 8 and second electrode 25 are, in order, superimposed together is adapted to function as the capacitor section 105.

The first electrode 10 is connected, by a conductive connecting layer 13 passing via a through hole 5a formed on the gate insulating film 5, to the address wiring 11 from which a potential is supplied to the first electrode 10. The connecting layer 13 is composed of the same transparent conductive film (i.e., made of ITO) as used for the transparent electrode 6. The transparent electrode 6 is connected, via the through hole 8a formed on the upper layer insulating film 8, to the source electrode 4 formed on the thin-film transistor section 103.

When a potential is supplied between the address wiring 11 and the data wiring 12, either of the drain electrode 3 connected to the data wiring 12 or the source electrode 4 connected to the transparent electrode 6 is selectively connected by the gate 11a connected to the address wiring 11 in the thin-film transistor section 103. At this point, in the capacitor section 105, electrostatic capacitance is accumulated between the first electrode 10 connected to the address wiring 11 and the second electrode 25 extending from the transparent electrode 6.

In the capacitor section 105, since the dielectric layer (the upper layer insulating film 8) between electrodes is composed of the silicon nitride film having its film thickness being smaller than that of the gate insulating film 5 and having a high dielectric constant, electrostatic capacitance per area is made larger when compared with that in the conventional liquid-crystal display device employing the gate insulating film 5 as the dielectric layer. Moreover, since the whole surface portion of the TFT array substrate 100 is formed with the upper insulating film 8 and the transparent conductive film (made of ITO) constituting the transparent electrode 6 and since the conductive film made of Cr metal is not exposed, defects caused by the exposure of the metal film on the TFT array during next processes including the application of polyimide and treatment of orientation can be eliminated, thus allowing the production of the liquid-crystal display device having an excellent yield and high reliability.

The liquid-crystal display device according to the first embodiment can be manufactured in accordance with sequential steps shown in FIGS. 3 to 7.

Figure 3:
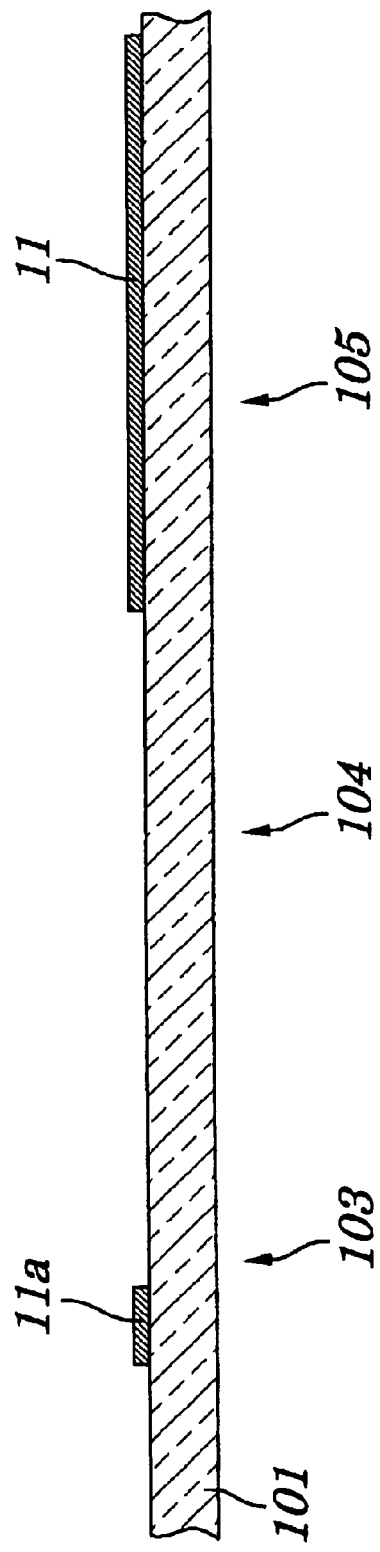
FIG. 3 is a view showing one step for producing the picture element area of the liquid-crystal device according to the first embodiment.

First, as shown in FIG. 3, on the glass insulating substrate 101, a plurality of the address wiring 11 composed of Cr 1400 angstroms thick is formed to be arranged in parallel to each other. Each of the address wiring 11 is patterned in the thin-film transistor section 103 of each of the picture element areas so that the gate 11a is extended therein.

Figure 4:
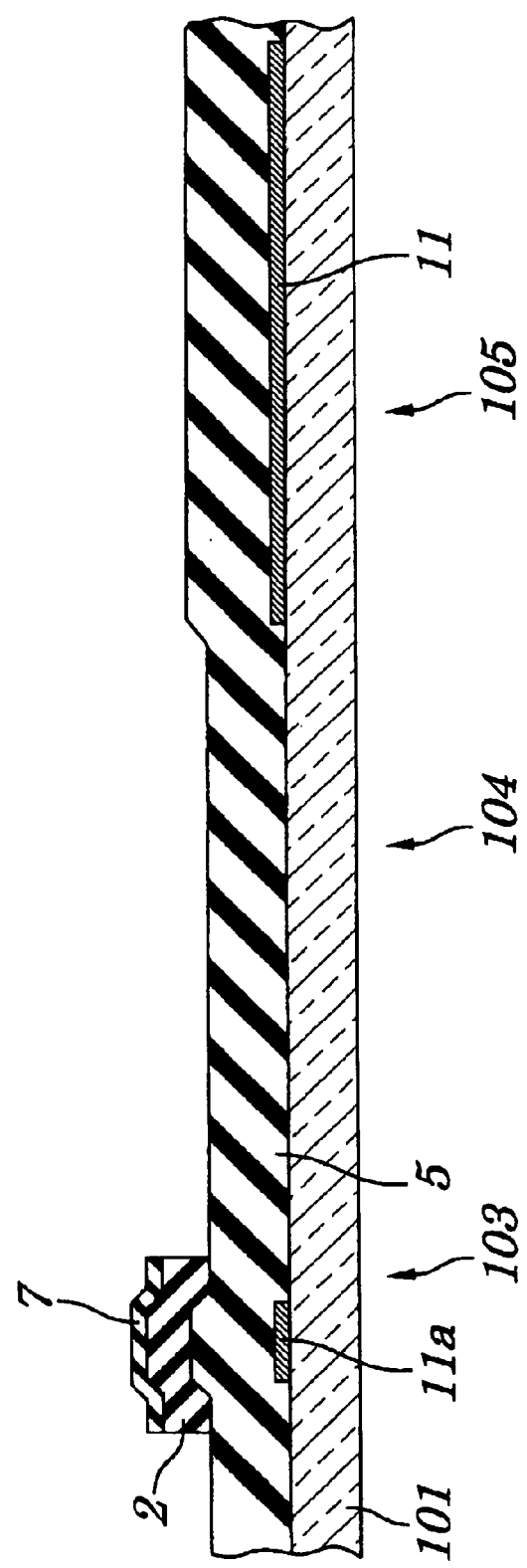
FIG. 4 is a view showing another step for producing the picture element area of the TFT array substrate in the liquid-crystal device according to the first embodiment.
Figure 5:
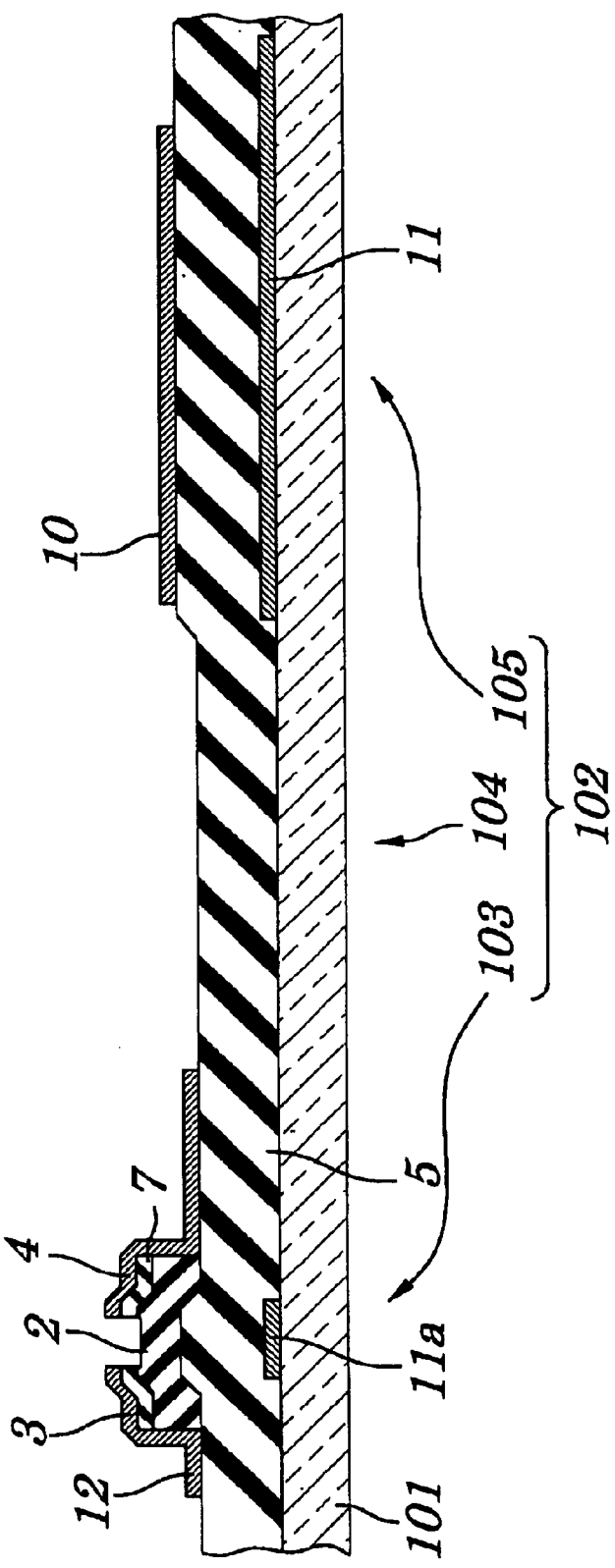
FIG. 5 is a view showing a third step for producing the picture element area of the TFT array substrate in the liquid-crystal device according to the first embodiment.

As shown in FIG. 4, on the whole surface of the insulating substrate 101 with the address wiring 11 formed, the gate insulating film 5 composed of a silicon oxide film 1500 angstroms thick and a silicon nitride film 3250 angstroms thick is formed. Then, in the thin-film transistor section 103, an amorphous silicon layer used as a channel layer is formed on the gate insulating film 5. On the amorphous silicon film, an n-type amorphous silicon layer used as a contact layer is grown. Following patterning, the channel layer 2 composed of the non-doped amorphous silicon 3300 angstroms thick and the contact layer 7 composed of the n-type amorphous silicon 500 angstroms thick are formed.

As shown in FIG. 3, on the gate insulating film 5, a plurality of data wiring 12, 12, . . . is so formed with Cr material 1400 angstroms thick that the address wiring 11, 11, . . . and the data wiring 12 cross each other. In each of the picture element areas 102, on the contact layer 7 formed on the channel layer 2, the drain electrode 3 extending from the data wiring 12 and the source electrode 4 disposed facing the drain electrode 3 are formed. At the same time, in the capacitor section 105, the first electrode 10 is formed with the same Cr metal film as used for the data wiring 12. In this embodiment, the first electrode 10 is composed of the metal film made of Cr (Chromium), however, the metal film may be made of Ti (Titanium), Al (Aluminium), W (Tungsten), Mo (Molybdenum), Ta (Tantalum) or the like, or a stacked film thereof or an alloying film thereof.

Figure 6:
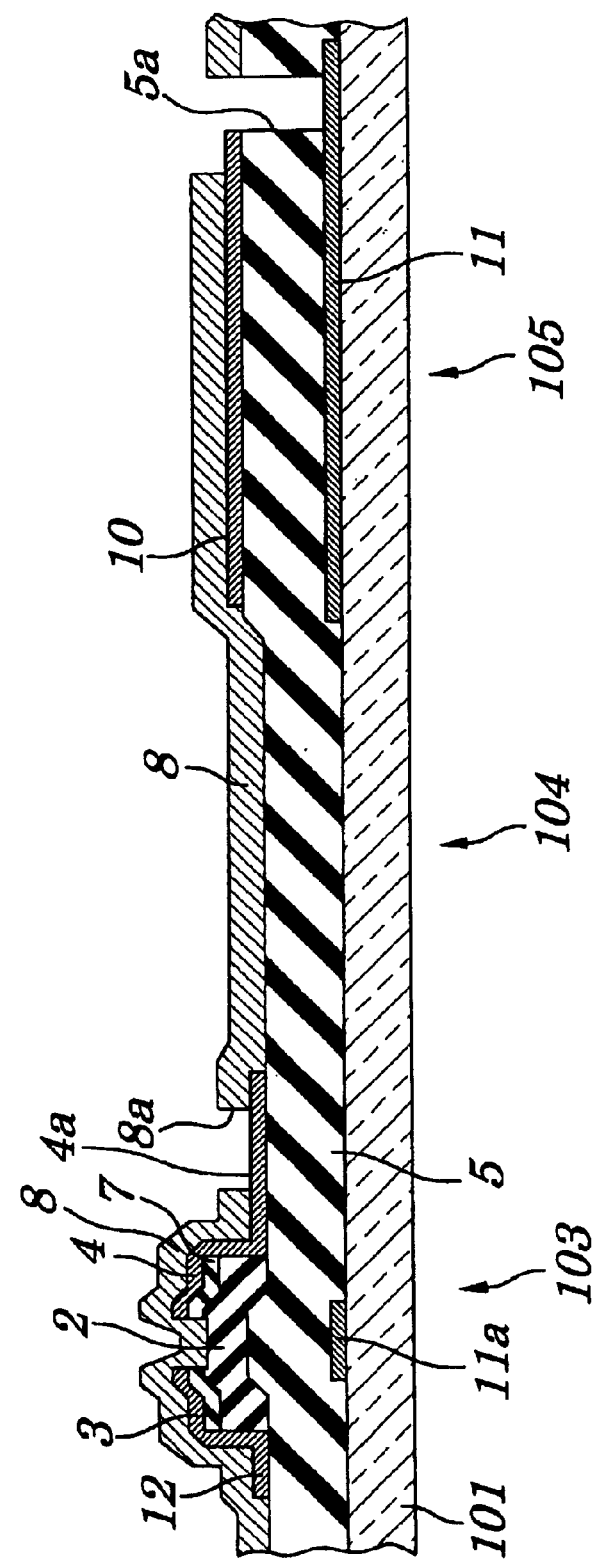
FIG. 6 is a view showing a fourth step for producing the picture element area of the TFT array substrate in the liquid-crystal device according to the first embodiment.

As shown in FIG. 6, the upper layer insulating film 8 composed of a silicon nitride film 1500 angstroms thick is formed so that the upper layer insulating film 8 covers the thin-film transistor section 103, image section 104, capacitor section 105. Next, in the thin-film transistor section 103, on the upper insulating film 8 is formed a through hole 8a extending from the source electrode 4 to a lead section 4a. In the capacitor 105, a through hole 5a is formed which is connected to the address wiring 11 through the upper insulating film 8 and the gate insulating film 5.

Figure 7:
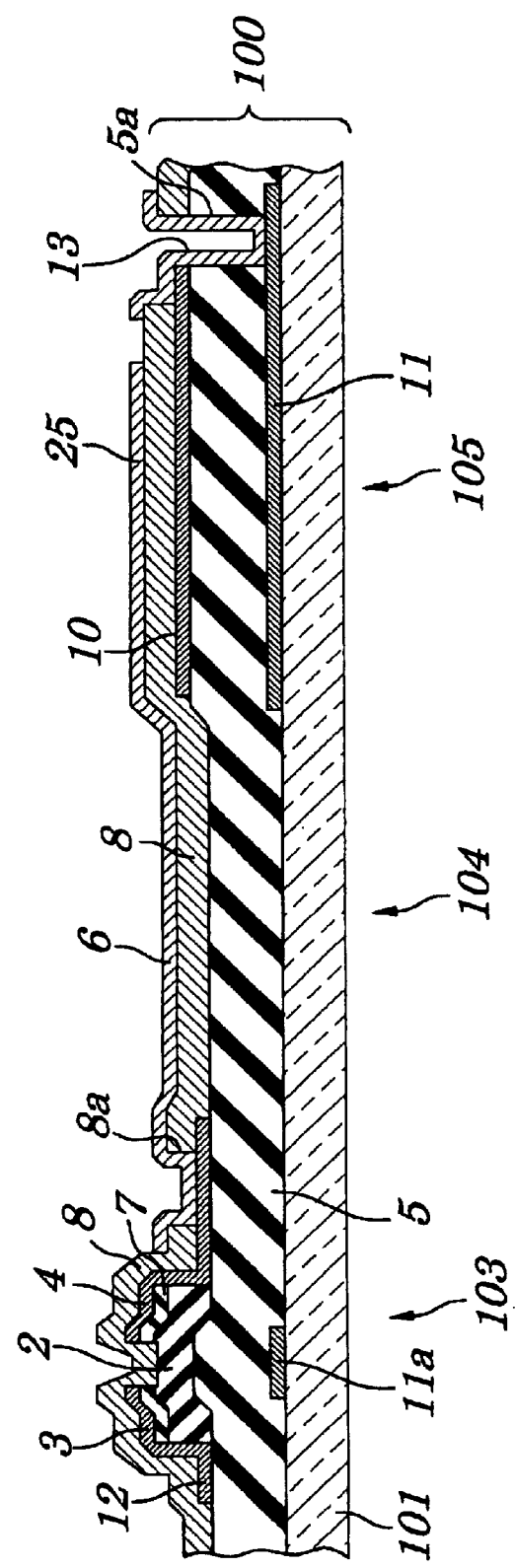
FIG. 7 is a view showing a fifth step for producing the picture element area of the TFT array substrate in the liquid-crystal device according to the first embodiment.

As shown in FIG. 7, on the upper layer insulating film 8 is formed the transparent electrode 6 composed of ITO 400 angstroms thick which covers the whole image section 104. The transparent electrode 6 extends toward the thin-film transistor section 103 and is connected to the source electrode 4 via the through hole 8a and also extends toward the capacitor section 105 and forms the second electrode 25 disposed facing the first electrode 10.

On the other hand, a connecting layer 13 used to connect the first electrode 10 with the address wiring 11 via the through hole 5a is formed, which is not connected to the transparent electrode 6, however, is composed of the same ITO as used for the transparent electrode 6 and which constitutes the TFT array substrate 100.

Second Embodiment

Figure 8:
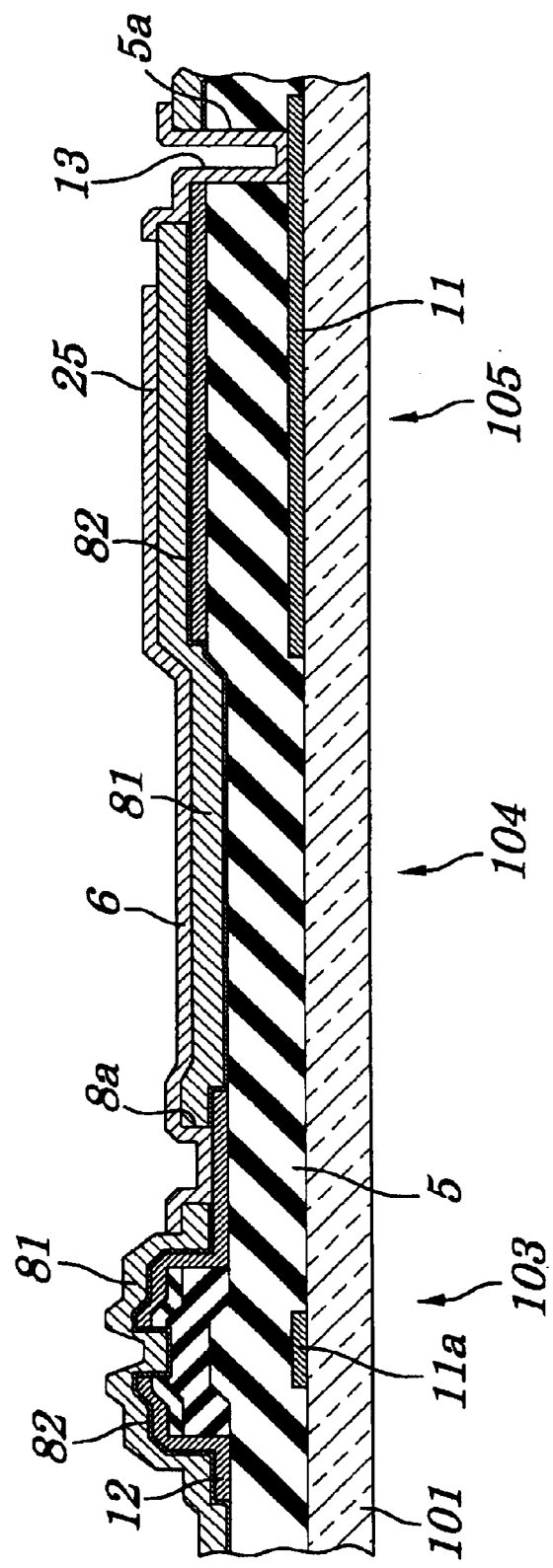
FIG. 8 is a cross-sectional view of a picture element area of a liquid-crystal display device according to a second embodiment.

FIG. 8 is a cross-sectional view of a picture element area of the TFT array substrate in a liquid-crystal display device according to a second embodiment. Configurations of the liquid-crystal display device of the second embodiment shown in FIG. 8 are the same as those in the first embodiment except an upper layer insulating film 8. That is, as shown in FIG. 8, the upper layer insulating film 8 of the second embodiment is composed of a complex film of a silicon nitride film 81 and a silicon oxide film 82. Generally, though the dielectric constant of the silicon nitride film is higher than that of the silicon oxide film, the structure of the silicon nitride film is coarser than that of the silicon oxide film. Because of this, there is a possibility that such properties specific to a passivation film as insulating strength or moisture resistance are decreased. Accordingly, in the first embodiment, it is necessary that the silicon nitride film is thicker and it is impossible to further increase the electrostatic capacitance. However, in the second embodiment, the upper layer insulating film 8 is composed of the complex film of the silicon nitride film 81 having the higher dielectric constant and of the silicon oxide film 82 having a finer structure which makes the upper layer insulating film 8 less affected by manufacturing processes, thus improving its reliability.

Third Embodiment

Figure 9:
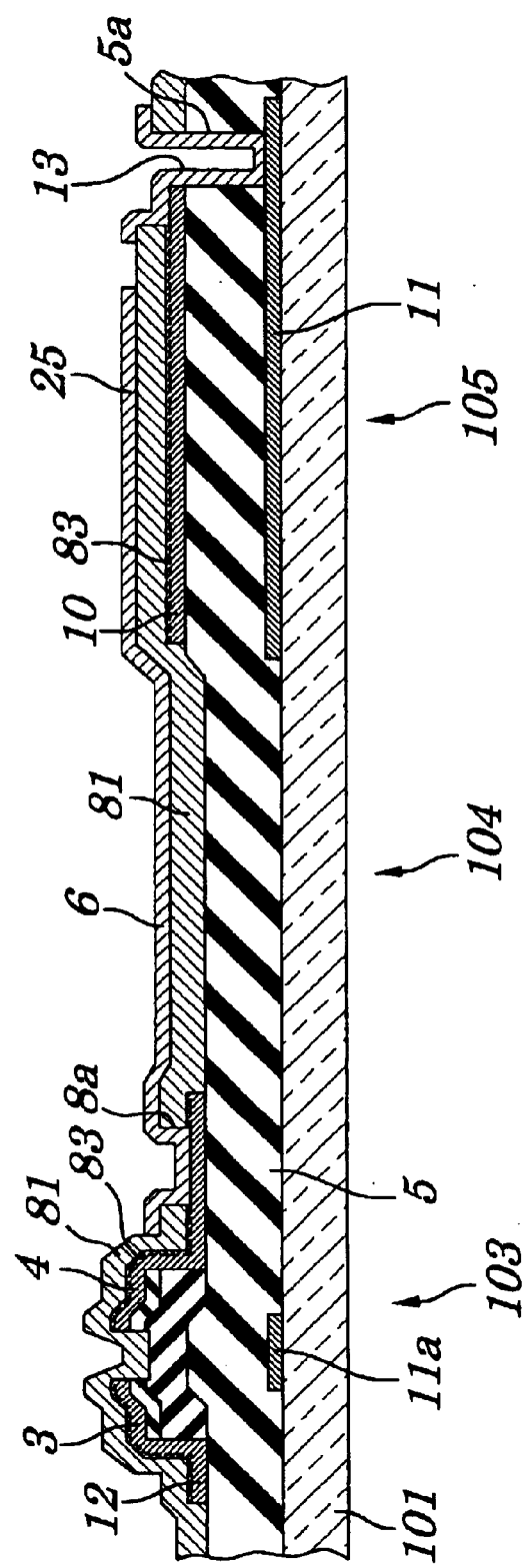
FIG. 9 is a cross-sectional view of a picture element area of a liquid-crystal display device according to a third embodiment.

FIG. 9 is a cross-sectional view of a picture element area of the TFT array substrate in a liquid-crystal display device according to a third embodiment. Configurations of the liquid-crystal display device of the third embodiment shown in FIG. 9 are the same as those in the first embodiment except an upper layer insulating film. As shown in FIG. 9, in the third embodiment, a metal oxide film 83 is formed on a surface of the Cr metal film constituting the data wiring 12, drain electrode 3, source electrode 4 and the first electrode 10, on which the silicon nitride film 81 is formed. That is, the upper layer insulating film of the third embodiment is composed of a complex film of the silicon nitride film 81 and the metal oxide film 83 having a fine structure. In this case, the through hole 8a is so formed that it can reach a metal surface of the source electrode 4.

Thus, in the third embodiment, the upper layer insulating film is composed of the complex film of the silicon nitride film 81 having the higher dielectric constant and of the metal oxide film 83 having a finer structure, thus improving its reliability.

The metal oxide film 83 can be formed by anode oxidation on a surface of a metal film constituting an electrode. Tantalum oxide film, aluminium oxide film and tungsten oxide film are preferably used as the metal oxide film. Moreover, the metal oxide film 83 may be formed by a sputtering CVD (Chemical Vapor Deposition) method as well. Films such as tantalum oxide films having a high dielectric constant in particular (i.e., the dielectric constant of $Ta_2O_5$ is about 22 to 45 while that of the silicon nitride is about 6) is preferably used, which can improve greatly capacitance per unit area.

Fourth Embodiment

Figure 10:
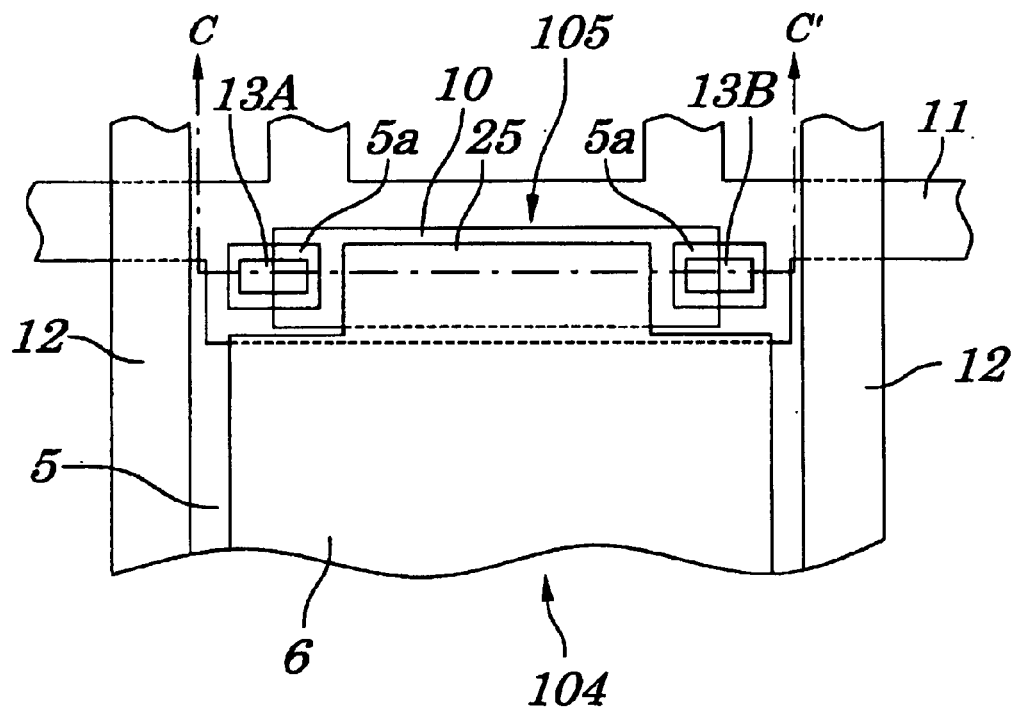
FIG. 10 is a plan view showing a part of a picture element area of a liquid-crystal display device according to a fourth embodiment.
Figure 11:
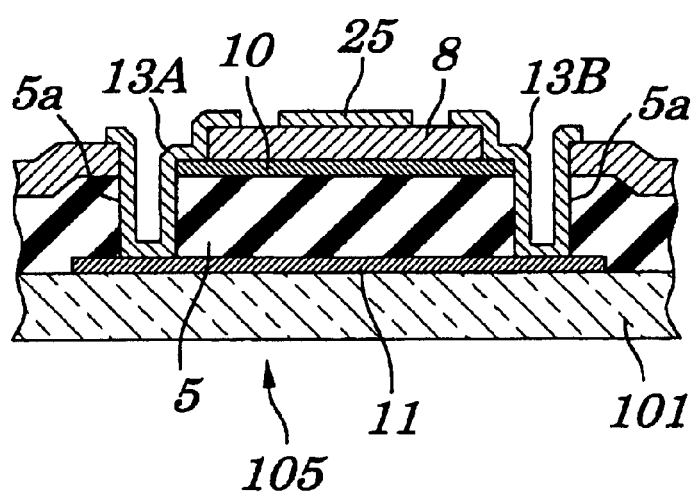
FIG. 11 is a cross-sectional view of the picture element area taken on line C–C' in FIG. 10.

FIG. 10 is a cross-sectional view showing a part of a picture element area of the TFT array substrate in a liquid-crystal display device according to a fourth embodiment. FIG. 11 is a cross-sectional view of the picture element area taken on line C–C' in FIG. 10. In the capacitor section 105 of the liquid-crystal display device of the fourth embodiment, the first electrode 10 is connected to the address wiring 11 at two points being apart from each other. That is, on the gate insulating film 5 where both ends of the first electrode 10 in a longitudinal direction are positioned, through holes 5a and 5a are formed, each of them reaching the address wiring 11, and connecting layers 13A and 13B used to connect the first electrode 10 with the address wiring 11 via these through holes 5a and 5a are formed.

According to the liquid-crystal display device of the fourth embodiment, if, for example, a connection failure occurs at a connection point related to one connecting layer 13A, when the other connecting layer 13B is normally connected, functions of the capacitor section 105 are not affected. Even if such failures as breakage or crack occur in the address wiring between the connecting layers 13A and 13B during processes, since continuity is ensured among the connecting layer 13A, the first electrode 10 and the connecting layer 13B, yield and reliability in production process are improved. Moreover, since the first electrode 10 is connected in parallel to the address wiring 11, resistance of the address wiring 11 can be reduced and, therefore, a delay in the transmission of address signals can be decreased and the speed of selecting signals can be increased.

Fifth Embodiment

Figure 12:
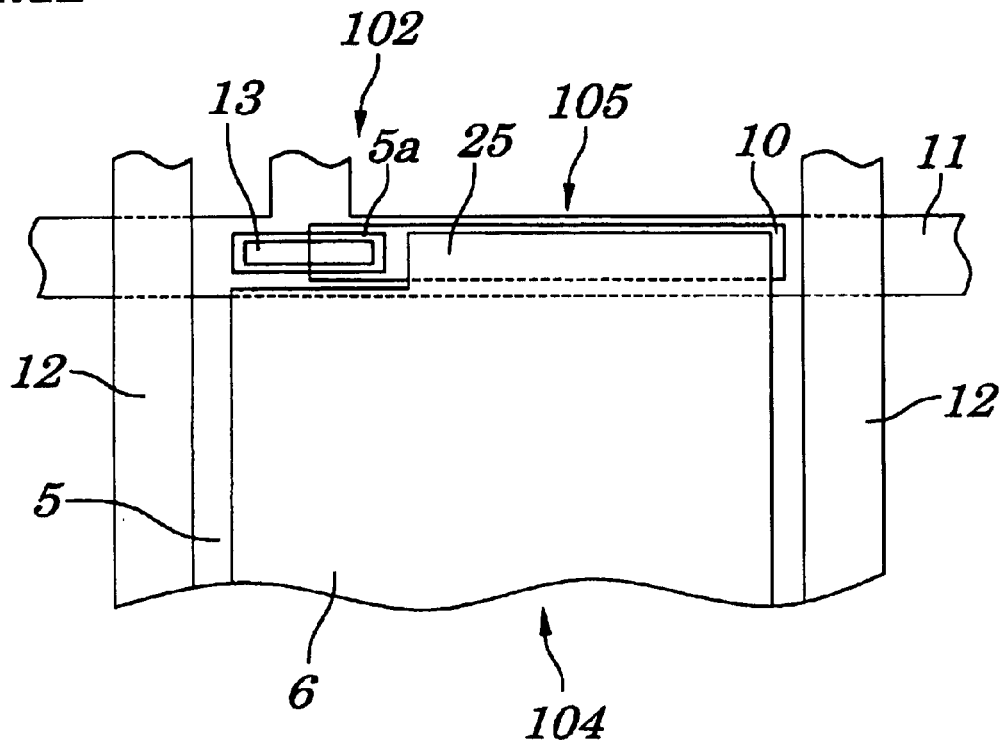
FIG. 12 is a cross-sectional view showing a part of a picture element area of a liquid-crystal display device according to a fifth embodiment.

FIG. 12 is a cross-sectional view showing a part of the picture element area of a liquid-crystal display device according to a fifth embodiment. According to this fifth embodiment, in the picture element area 102, a width of the address wiring 11 is constant and is so configured that the address wiring 11 hides behind a black matrix (not shown). The capacitor section 105 is so constructed that the whole of it is superimposed on the address wiring 11 through the gate insulating film 5. Within a width of the address wiring 11, the first electrode 10 composed of a metal thin-film is formed through the gate insulating film 5 and, on the first electrode 10, the second electrode 25 composed of the transparent electrode 6 extending from the image section 104 is formed through the upper layer insulating film. The first electrode 10 is connected, through the connecting layer 13 passing through the through hole 5a formed on the gate insulating film 5, to the address wiring 11.

According to this embodiment, since the capacitor section 105 is superimposed on the address wiring 11 which hides behind the black matrix, an aperture ratio of the picture element area 102 is kept maximized substantially. By using the complex film as shown in the second and third embodiments as a dielectric film of the capacitor section 105, since electrostatic capacitance can be made larger with the aperture ratio kept maximized, an image quality is further improved.

Sixth Embodiment

Figure 13:
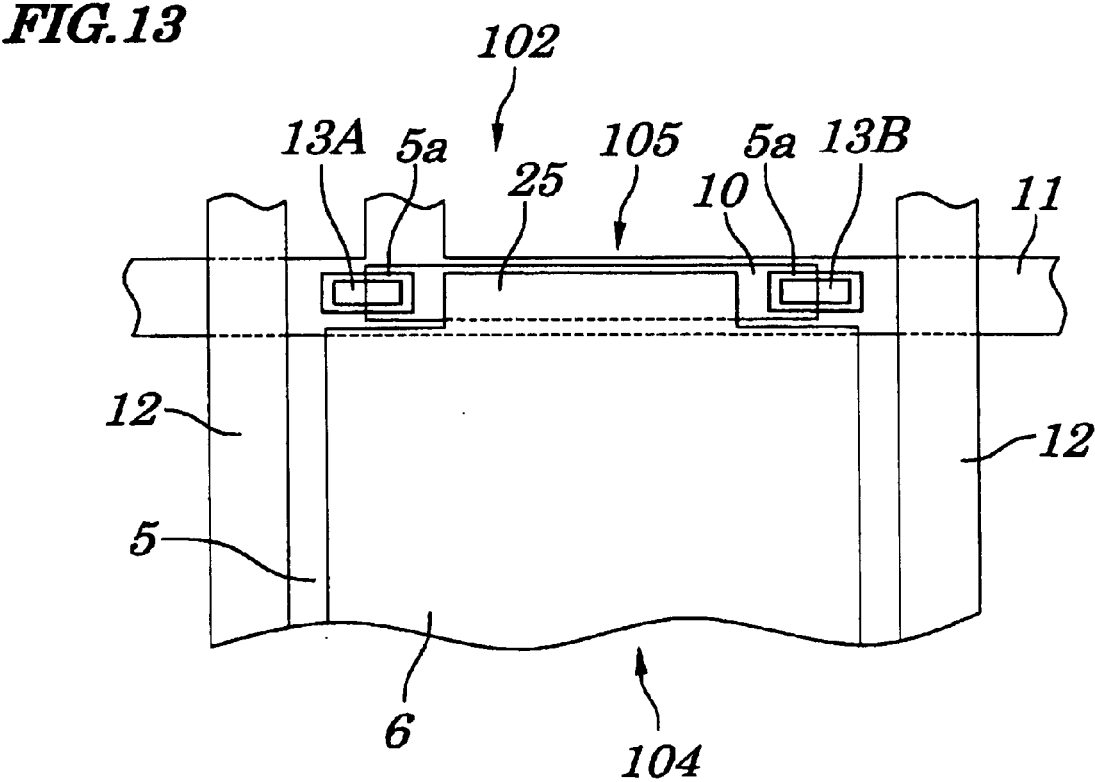
FIG. 13 is a cross-sectional view showing a part of a picture element area of a liquid-crystal display device according to a sixth embodiment.

FIG. 13 is a cross-sectional view showing a part of the picture element area of a liquid-crystal display device according to a sixth embodiment. According to this sixth embodiment, in the picture element area 102, a width of the address wiring 11 is constant and is so configured that the address wiring 11 hides behind a black matrix (not shown). The capacitor section 105 is so constructed that the whole of it is superimposed on the address wiring 11 through the gate insulating film 5. On the gate insulating film 5 where both ends of the first electrode 10 in a longitudinal direction are positioned, the through holes 5a and 5a are formed, each of them reaching the address wiring 11, and connecting layers 13A and 13B used to connect the first electrode 10 with the address wiring 11 via these through holes 5a and 5a are formed.

According to this embodiment, since the capacitor section 105 is formed in a manner that it is superimposed on the address wiring 11 hiding behind the black matrix and the first electrode 10 is connected at two points being apart from each other, of the connecting layers 13A and 13B, to the address wiring 11, though electrostatic capacitance decreases somewhat compared with the case of the fifth embodiment, yield and reliability in the manufacturing processes can be improved with the aperture ratio of the picture element area substantially kept maximized.

Seventh Embodiment

Figure 14:
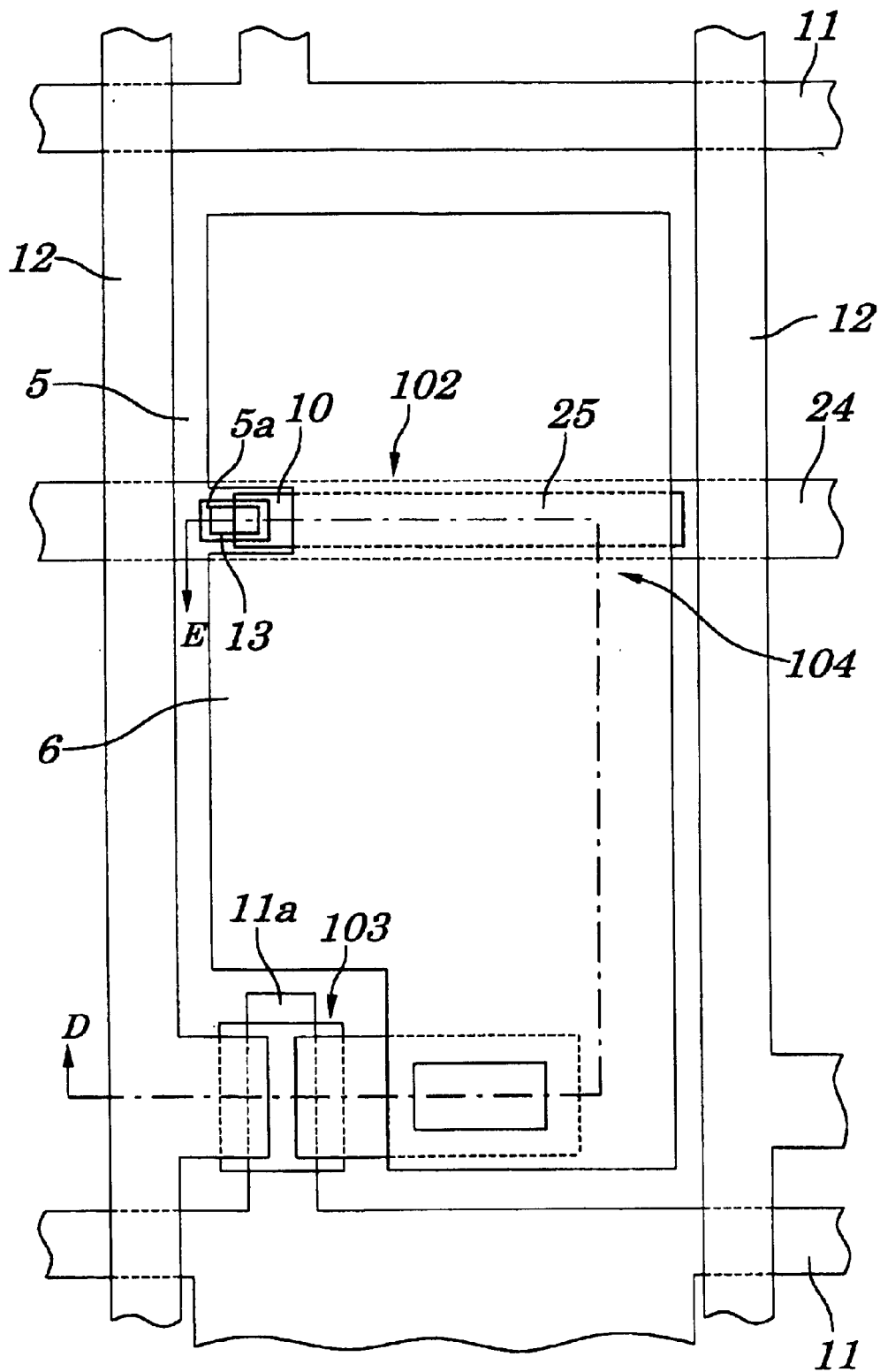
FIG. 14 is a plan view showing a part of a picture element area of a liquid-crystal display device according to a seventh embodiment.
Figure 15:
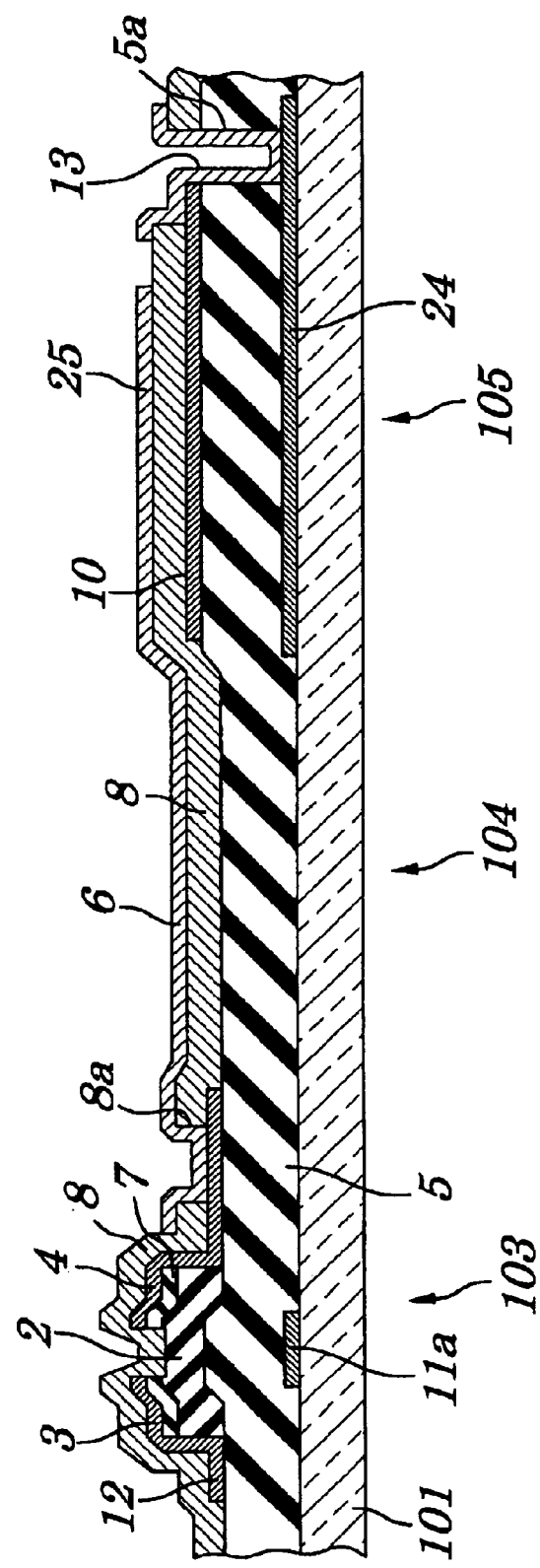
FIG. 15 is a cross-sectional view of the picture element area taken on line D–E in FIG. 14.

FIG. 14 is a cross-sectional view showing a part of the picture element area of a liquid-crystal display device according to a seventh embodiment. FIG. 15 is a cross-sectional view of the picture element area taken on line D–E in FIG. 14. According to this embodiment, an auxiliary capacitive common wiring 24 is mounted between the address wiring 11 and 11 each being adjacent to each other in a manner that it is placed in parallel to the address wiring 11 and 11, and the whole of the capacitor section 105 is formed so as to be superimposed on the auxiliary capacitive common wiring 24 through the gate insulating film 5. The first electrode 10 is connected to the auxiliary capacitive common wiring 24 through the connecting layer 13 passing through the through hole 5a formed on the gate insulating film 5. On the first electrode 10 is formed the upper layer insulating film 8, on which the transparent electrode 6 is formed and a part of the transparent electrode 6 constitutes the second electrode 25.

According to this embodiment, in addition to the address wiring 11 formed, since the auxiliary capacitive common wiring 24 used to provide a reference potential of electrostatic capacitance of the transparent electrode 6 is formed, independently of a gate potential of the thin-film transistor section, a reference potential of the capacitor can be set freely which allows an increased degree of freedom for designing, for example, high speed liquid-crystal display device. Thus, in this embodiment having the auxiliary capacitive common wiring 24 as well, the first electrode 10 can be connected, at two points being apart from each other, to the auxiliary capacitive common wiring 24.

The liquid-crystal display device of the seventh embodiment can be manufactured by the following steps.

First, on the insulating substrate 101 is formed a plurality of the address wiring 11, 11, . . . from which the gate 11a of each of the thin-film transistor sections 103 extends, and between the address wiring 11 and 11 being adjacent to each other is formed the auxiliary capacitive common wiring 24 in a manner that it is placed in parallel to the address wiring 11 and 11. Next, on the insulating substrate 101 on which the address wiring 11 and the auxiliary capacitive common wiring 24 are already mounted is formed the gate insulating film 5. On the gate insulating film 5 are formed the channel layer 2 and the contact layer 7 facing the gate 11a. Then, on the gate insulating film 5 is formed the data wiring 12 composed of a metal film. At the same time, on the channel layer 2 and the contact layer 7 are formed the drain electrode 3 and the source electrode 4 and is formed the first electrode 10 composed of the same metal film in the capacitor section 105. Then, the upper layer insulating film 8 is formed in a manner that it covers the thin-film transistor section 103, image section 104 and capacitor section 105. On the upper layer insulating film 8 are formed the through hole 8a reaching the lead section of the source electrode 4 in the thin-film transistor section 103 and the through hole 5a reaching the auxiliary capacitive common wiring 24 through the upper layer insulating film 8 and the gate insulating film 5 in the capacitor section 105. In the image section 104, the transparent electrode 6 connected via the through hole 8a to the source electrode 4 and extending to the capacitor section 105 is formed with ITO and the connecting layer 13 used to connect, via the through hole 5a, the first electrode 10 with the auxiliary capacitive common wiring 24 is formed with the same ITO.

Eighth Embodiment

Figure 16:
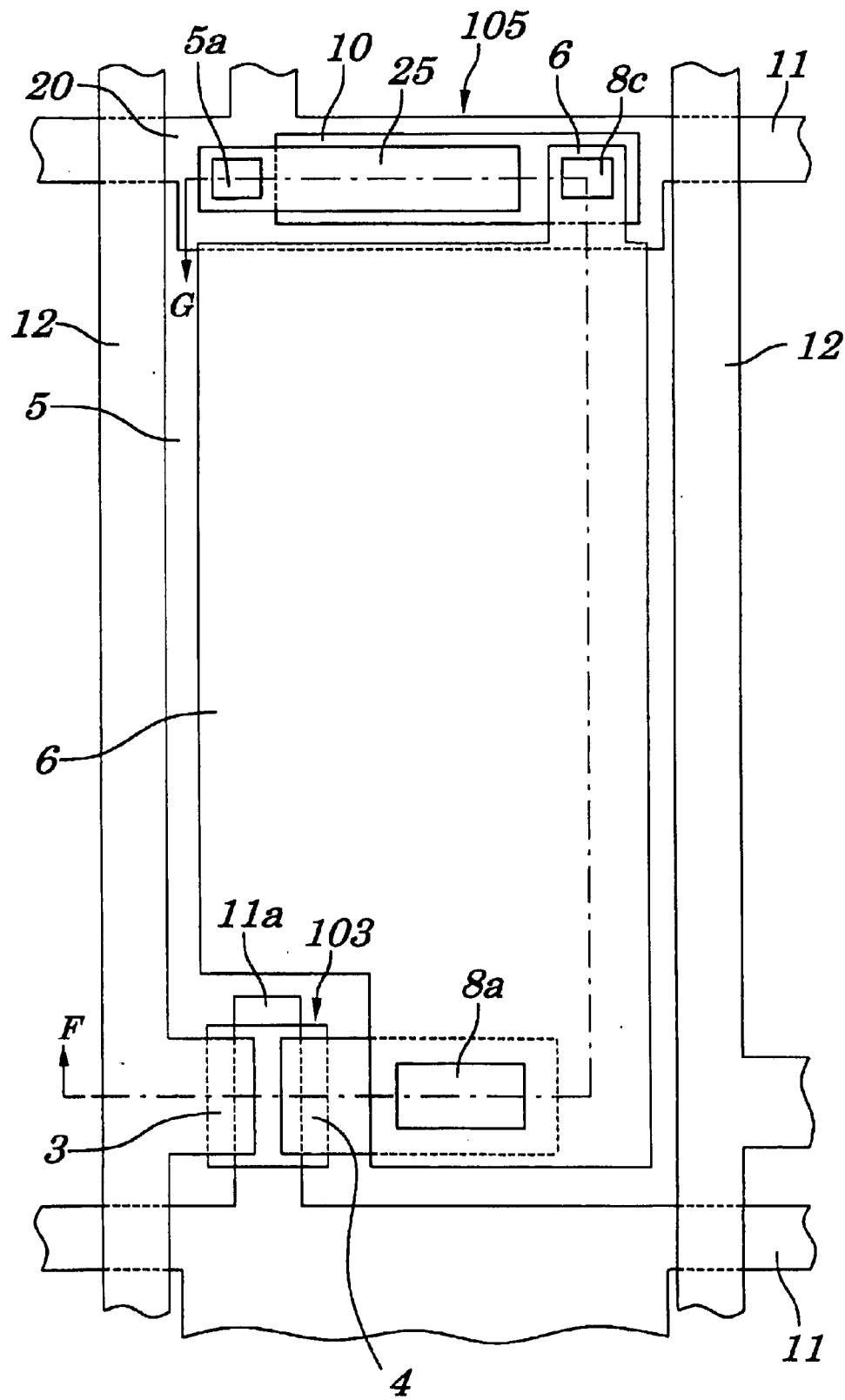
FIG. 16 is a plan view showing a part of a picture element area of a liquid-crystal display device according to an eighth embodiment.
Figure 17:
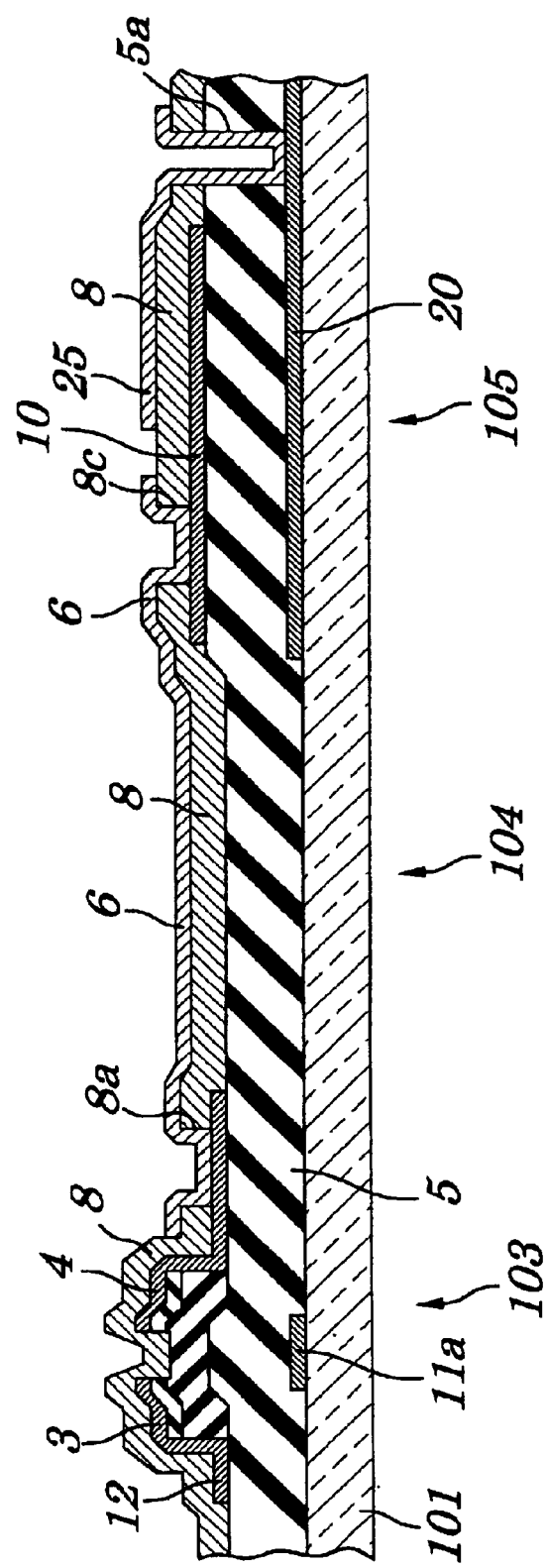
FIG. 17 is a cross-sectional view of the picture element area taken on line F–G in FIG. 16.

FIG. 16 is a plan view showing a part of the picture element area of a liquid-crystal display device according to a eighth embodiment. FIG. 17 is a cross-sectional view of the picture element area taken on line F–G in FIG. 16.

According to the liquid-crystal display device according to the eighth embodiment shown in FIGS. 16 and 17, in the capacitor section 105, the first electrode 10 is connected, via a through hole 8c formed on the upper layer insulating film 8 covering the thin-film transistor section 103 and the capacitor section 105, to the transparent electrode 6 formed on the upper layer insulating film 8, and the second electrode 25 is formed using the same ITO as used for the transparent electrode 6 on the upper layer insulating film 8, being apart from the transparent electrode 6. The second electrode 25 is connected, via the through hole 5a passing through the upper insulating film 8 and the gate insulating film 5, to a third electrode 20 formed on the address wiring 11. The third electrode 20 is formed at a position facing the first electrode 10 through the gate insulating film 5.

According to the eighth embodiment, the liquid-crystal display device is so configured that a first capacitive component formed by the third electrode 20, first electrode 10 and gate insulating film 5 put between these electrodes is connected in parallel to a second capacitive component formed by the first electrode 10, second electrode 25 and upper layer insulating film 8 put between these electrodes and, therefore, electrostatic capacitance per area in the picture element area can be greatly increased. Moreover, if the capacitance value is the same, aperture ratio can be improved. In addition, according to this embodiment, there is neither exposure of the metal electrode on the surface of the TFT array substrate nor defectsin next processes including the application of polyimide or treatment of orientation.

The liquid-crystal display device of the eighth embodiment can be manufactured by methods shown in FIGS. 18 to 22.

Figure 18:
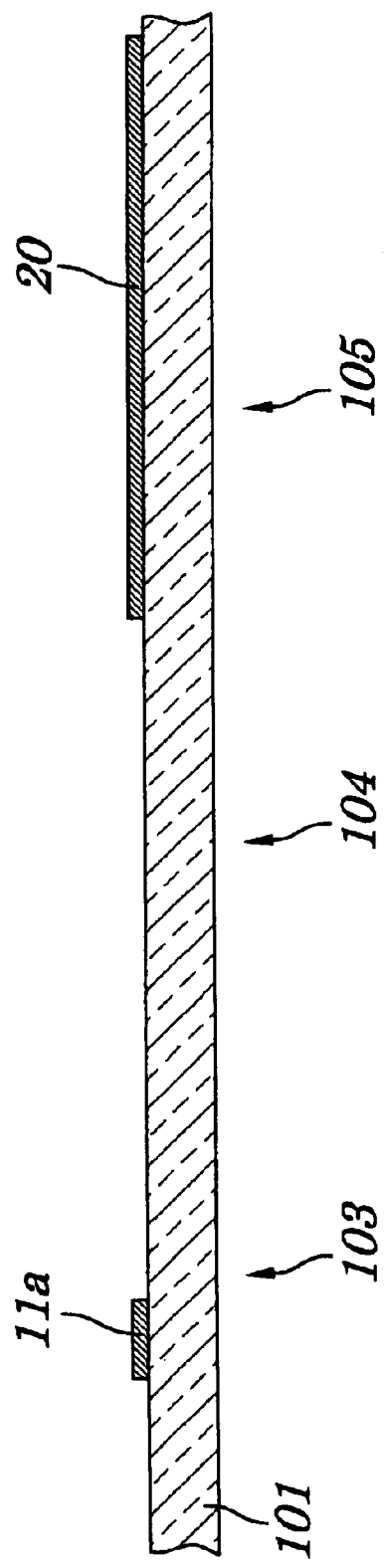
FIG. 18 is a view showing one step for producing the picture element area of the liquid-crystal device according to the eighth embodiment.
Figure 19:
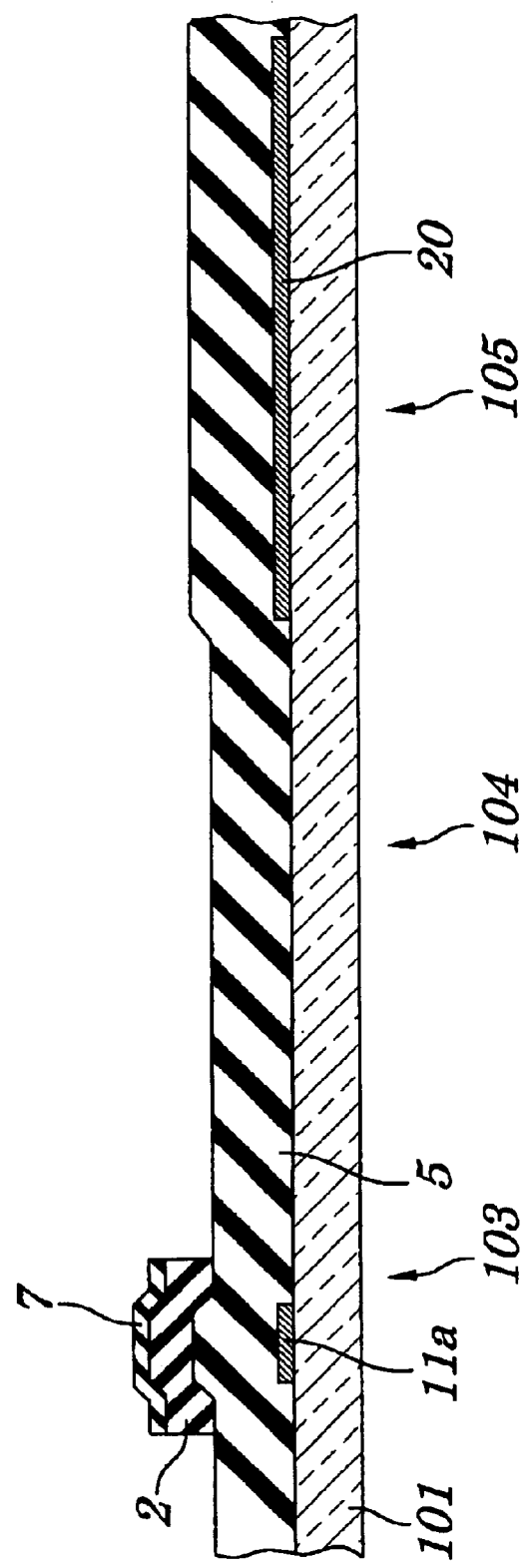
FIG. 19 is a view showing another step for producing the picture element area of the liquid-crystal device according to the eighth embodiment.

First, as shown in FIG. 18, on the gate insulating substrate 4 is formed a plurality of the address wiring 11 to be disposed in parallel to each other wherein the gate 11a extends in each of the thin-film transistor sections 103 and the third electrode 20 extends in each of the capacitor section 105. Next, as shown in FIG. 19, on the insulating substrate 101 is the gate insulating film 5 on which the channel layer 7 and contact layer 2 in the thin-film transistor section 103 are formed.

Figure 20:
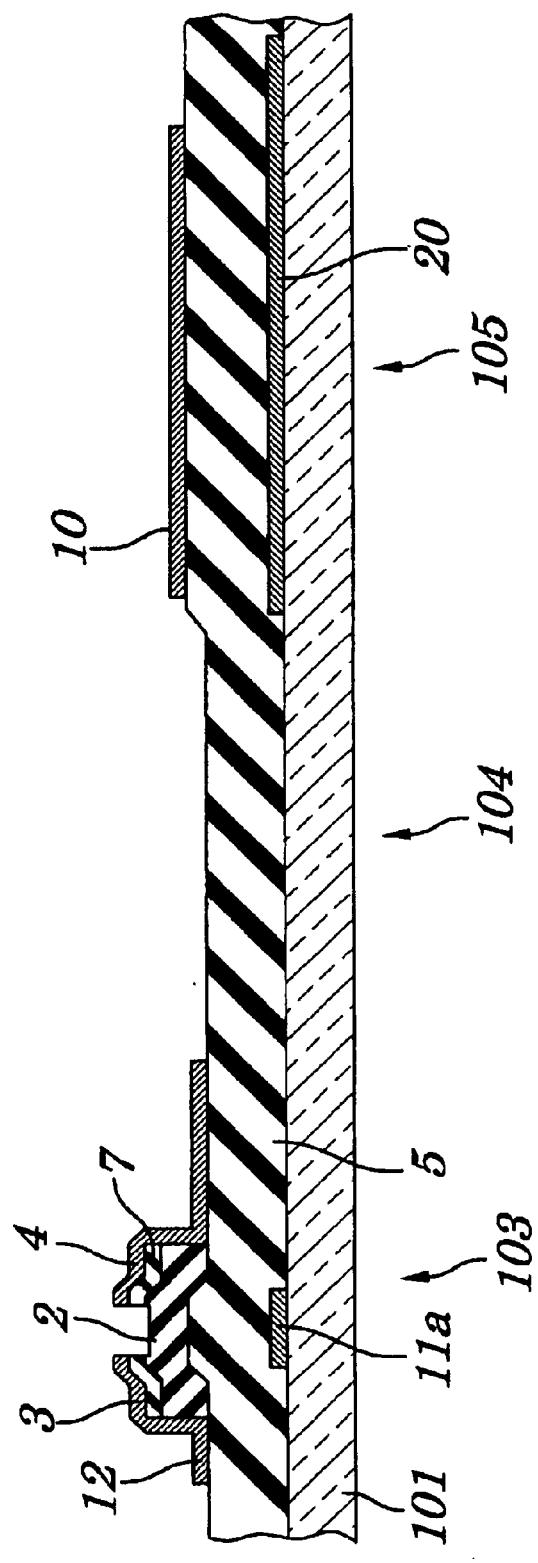
FIG. 20 is a view showing a third step for producing the picture element area of the liquid-crystal device according to the eighth embodiment.

As shown in FIG. 20, on the gate insulating film 5 is formed, with the Cr metal film, a plurality of data wiring 12, 12, . . . in parallel in a manner that the address wiring 11, 11, . . . and the data wiring cross each other and, in the picture element area 102, on the contact layer 7 superposed on the channel layer 2, the drain electrode 3 extending from the data wiring 12 and the source electrode 4 facing the drain electrode 3. At the same time, in the capacitor section 105, the first electrode 10 is formed with the same Cr metal films as used for the data wiring 12.

Figure 21:
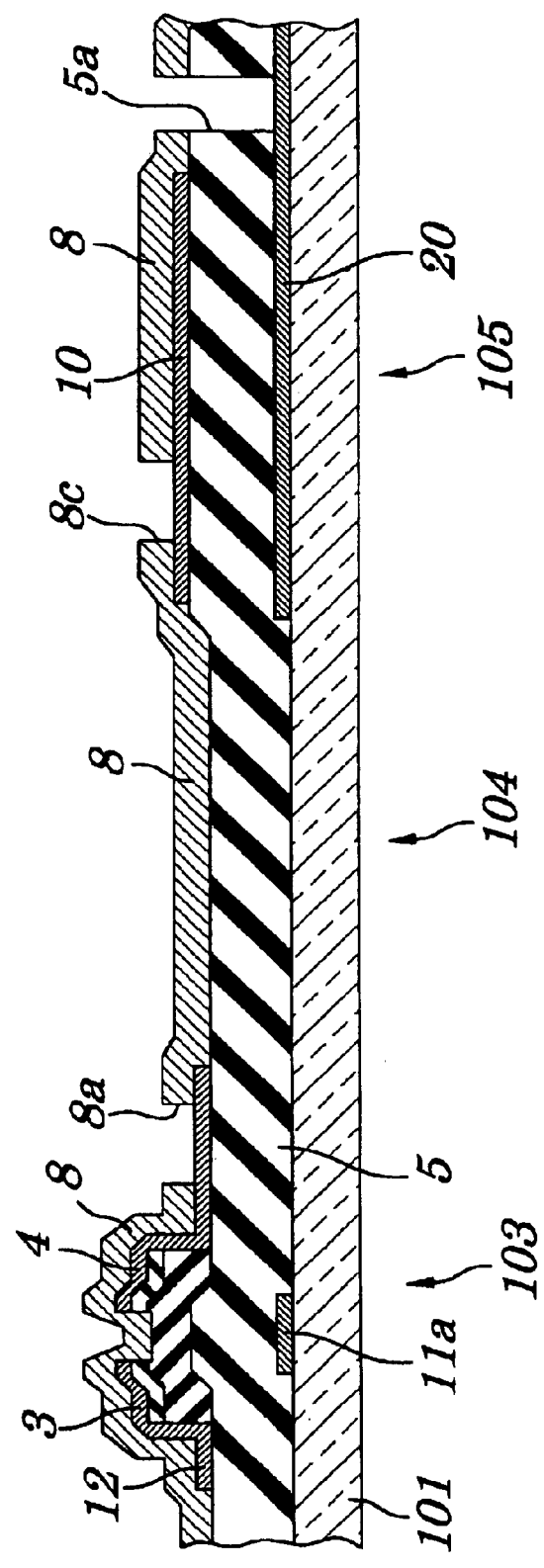
FIG. 21 is a view showing a fourth step for producing the picture element area of the liquid-crystal device according to the eighth embodiment.

As shown in FIG. 21, the upper layer insulating film 8 is formed which covers the thin-film transistor section 103, image section 104 and capacitor section 105. Then, in the thin-film transistor section 103, on the upper layer insulating film 8 are formed the through hole 8a which reaches the source electrode 4, the through hole 8c which reaches the first electrode 10 in the capacitor section 105 and the through hole 5a which reaches the third electrode 20 passing through the upper layer insulating film 8 and gate insulating film 5.

Figure 22:
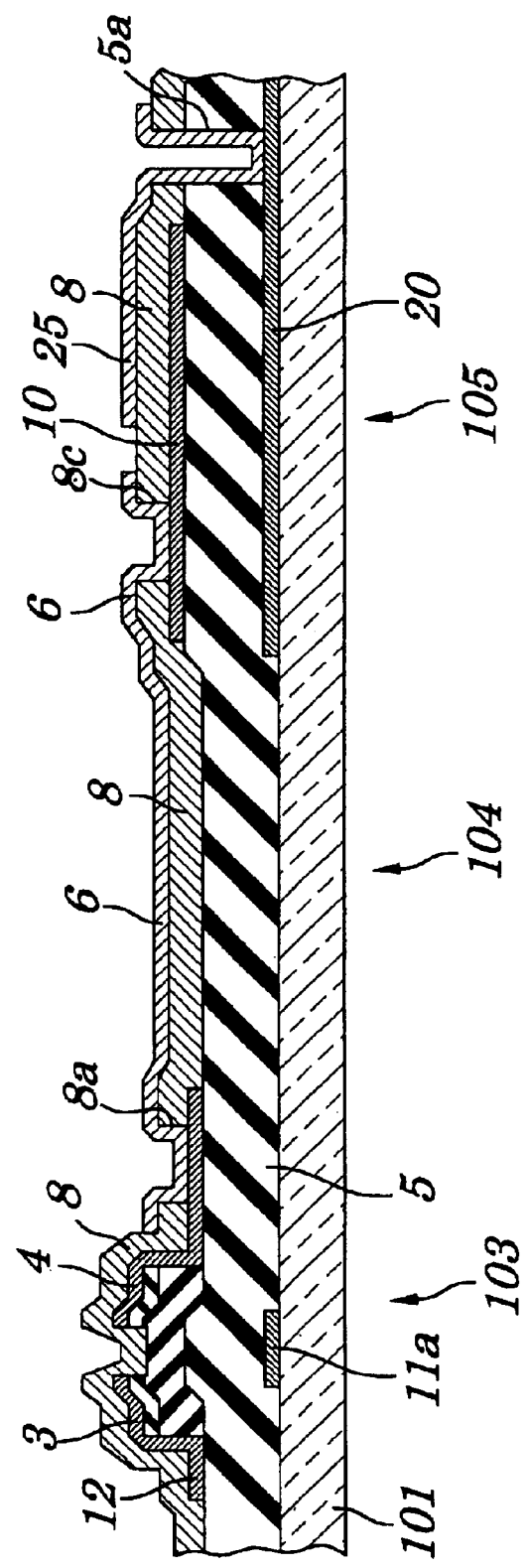
FIG. 22 is a view showing a fifth step for producing the picture element area of the liquid-crystal device according to the eighth embodiment.

As depicted in FIG. 22, the transparent electrode 6 made of ITO is formed on the upper layer insulating film 8, which covers the image section 104. The transparent electrode 6 extending to the thin-film transistor side is connected via the through hole 8a to the source electrode 4 and that extending to the capacitor section 105 side is connected via the through hole 8c. On the upper layer insulating film 8 is formed the second electrode 25 which is disposed apart from the transparent electrode 6 and connected via the through hole 5a to the third electrode 20.

Ninth Embodiment

Figure 23A:
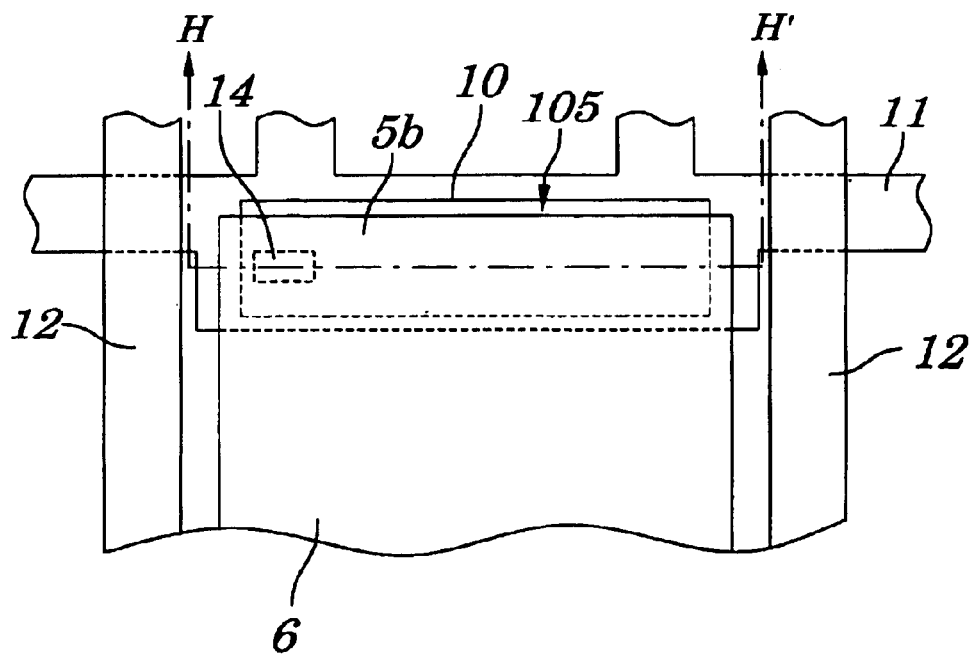
FIG. 23A is a plan view showing a part of a picture element area of a liquid-crystal display device according to a ninth embodiment and FIG. 23B is a cross-sectional view of the picture element area taken on line H–H'in FIG. 23A.
Figure 23B:
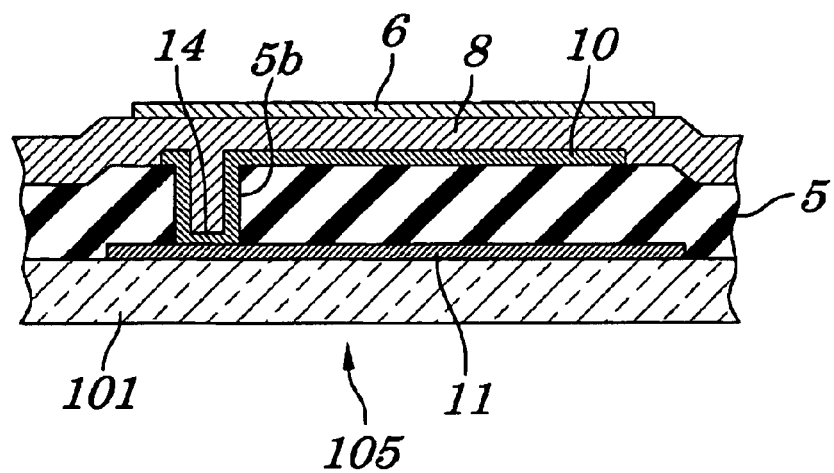

FIG. 23A is a plan view showing a part of the picture element area of a liquid-crystal display device according to a ninth embodiment. FIG. 23B is a cross-sectional view of the picture element area taken on line H–H' in FIG. 23A. As shown in FIGS. 23A and 23B, in the capacitor section 105, the first electrode 10 and the connecting layer 14 are integrally formed on the gate insulating film 5, which are connected by the connecting layer 14 to the address wiring 11 through the gate insulating film 5.

According to this ninth embodiment, unlike in the case of the first embodiment, since the upper layer insulating film 8 is formed on the connecting layer 14, there is no risk of short-circuit between the upper part of the connecting layer 14 and the transparent electrode 6. Since the Cr metal has more excellent conductivity than ITO, the area of the through hole 5b can be made smaller compared with that of the through hole 5a employed in the first embodiment in which the connecting layer passing via the through hole 5a is made of ITO, thus allowing the enlarged electrode area and the increased electrostatic capacitance per area in the capacitor section 105. Accordingly, the capacitor section 105 can be housed within the width of the address wiring 11, thus enabling the aperture ratio to be increased.

The liquid-crystal display device according to the ninth embodiment can be manufactured in accordance with sequential steps shown in FIGS. 24 to 29.

Figure 24:
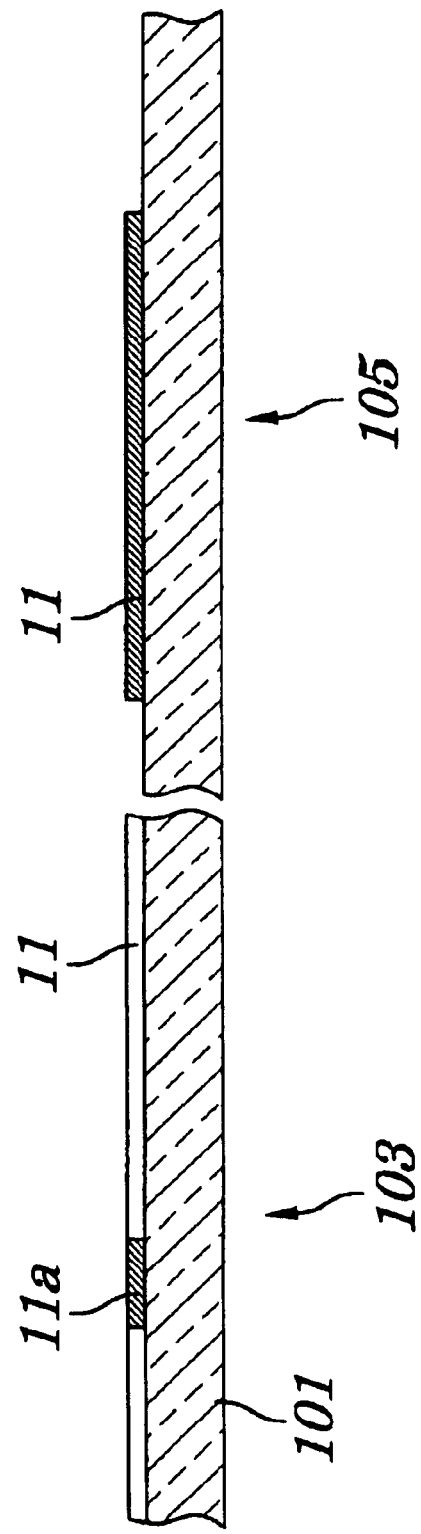
FIG. 24 is a view showing one step for producing the picture element area of the liquid-crystal device according to the ninth embodiment.
Figure 25:
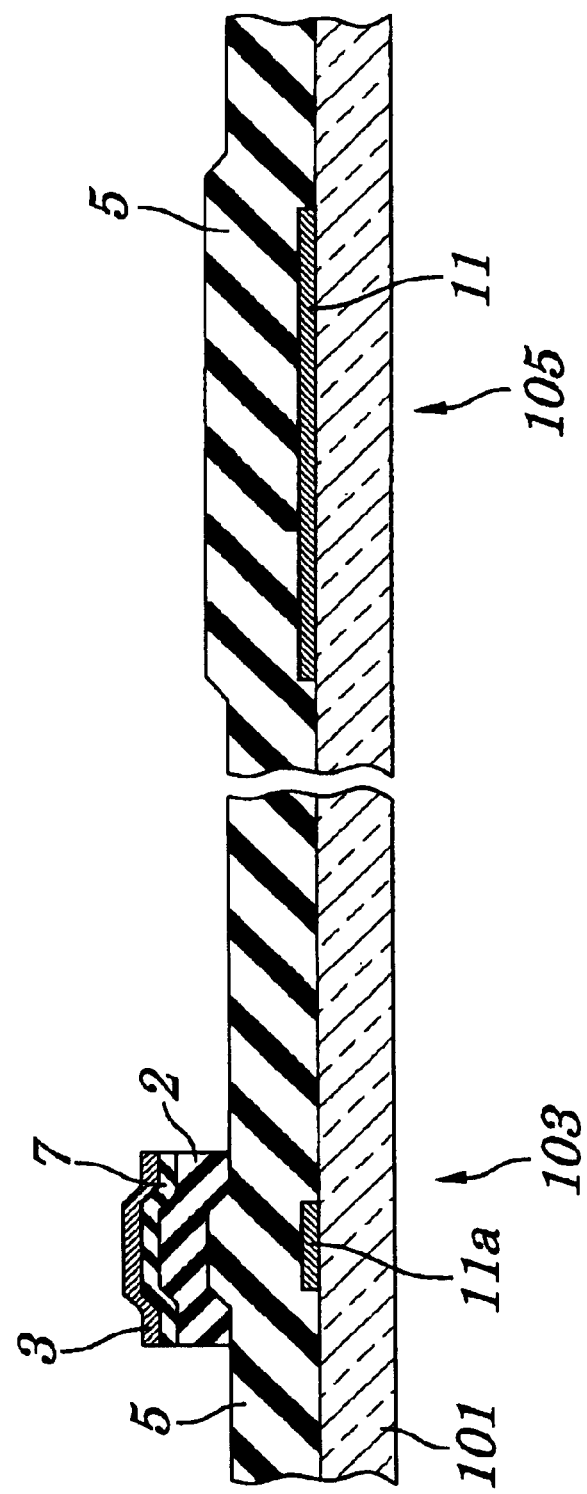
FIG. 25 is a view showing another step for producing the picture element area of the liquid-crystal device according to the ninth embodiment.
Figure 26:
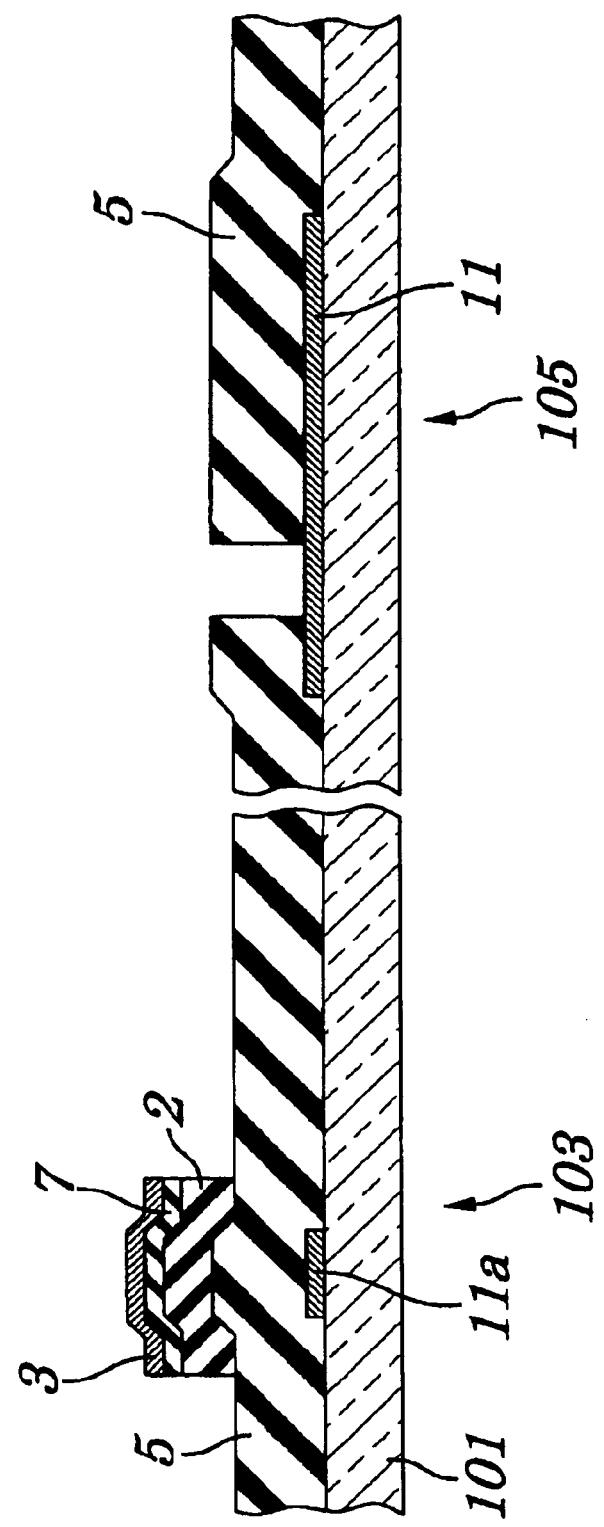
FIG. 26 is a view showing a third step for producing the picture element area of the liquid-crystal device according to the ninth embodiment.
Figure 27:
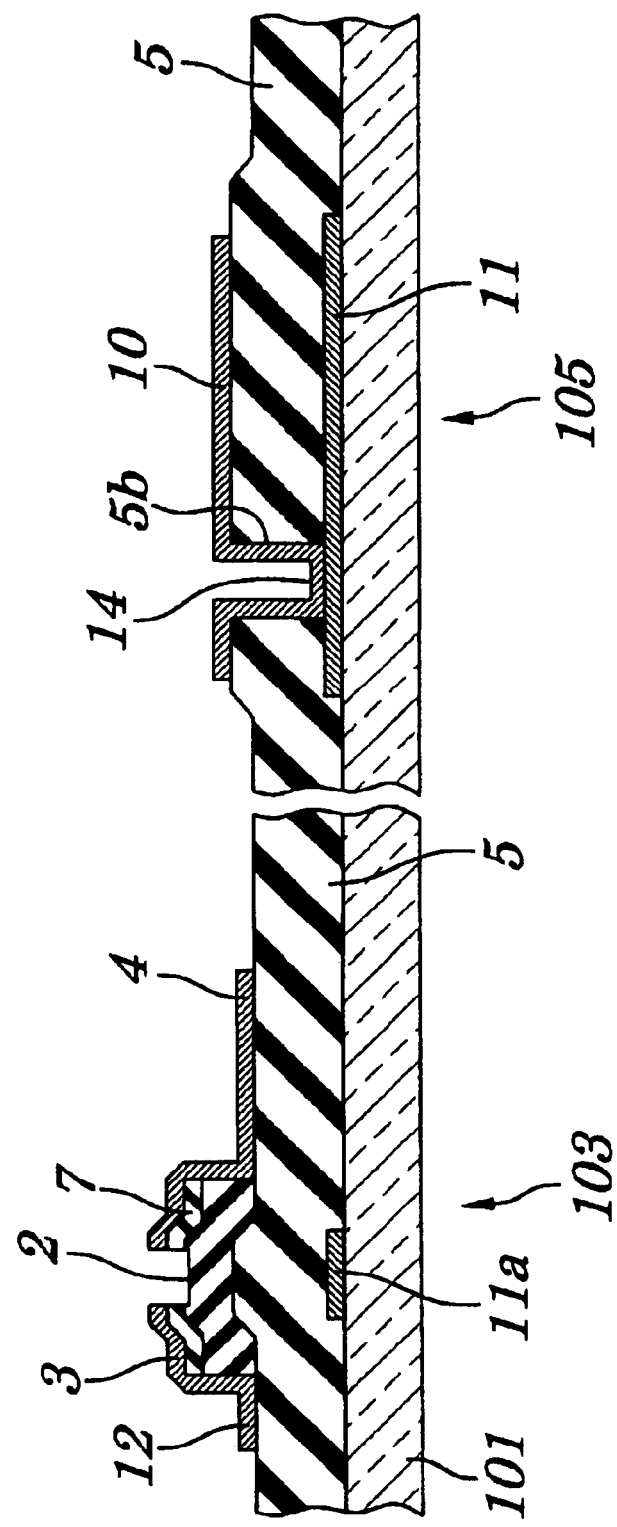
FIG. 27 is a view showing a fourth step for producing the picture element area of the liquid-crystal device according to the ninth embodiment.
Figure 28:
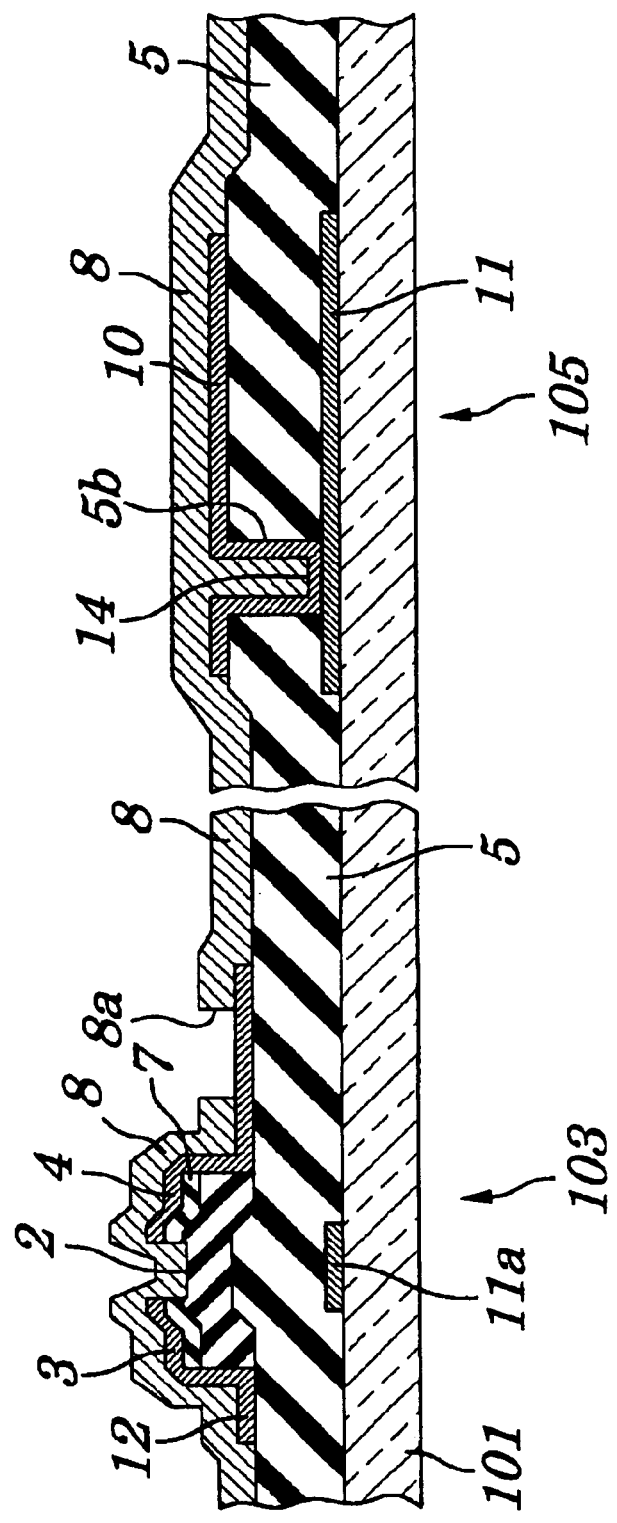
FIG. 28 is a view showing a fifth step for producing the picture element area of the liquid-crystal device according to the ninth embodiment.
Figure 29:
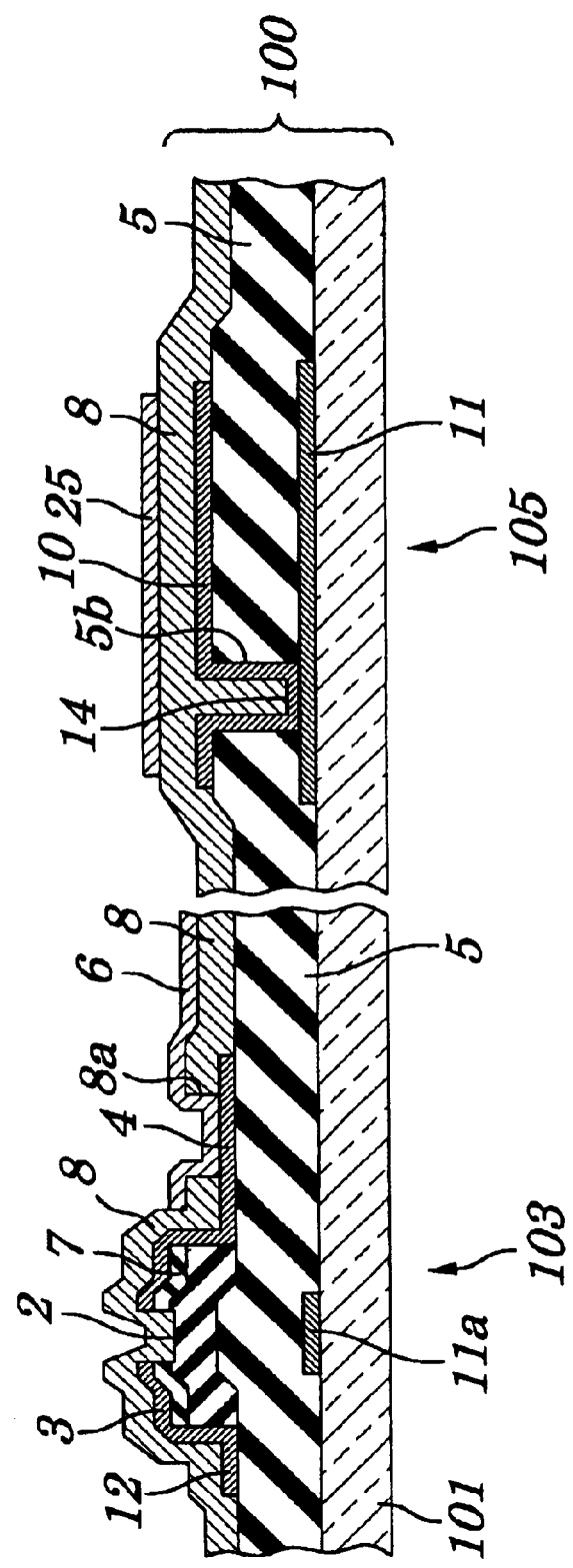
FIG. 29 is a view showing a sixth step for producing the picture element area of the liquid-crystal device according to the ninth embodiment.
Figure 30A:
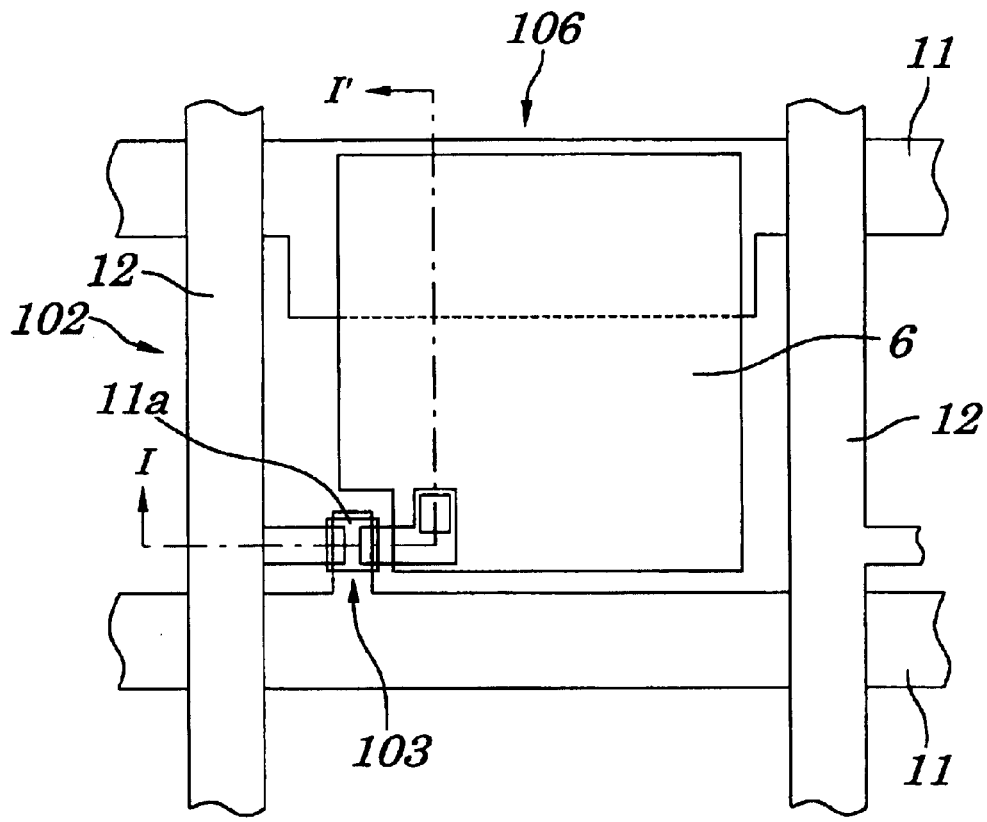
FIG. 30A is a plan view showing a part of a picture element area of the conventional liquid-crystal display device and FIG. 30B is a cross-sectional view of the picture element area taken on line I–I' in FIG. 30A.
Figure 30B:
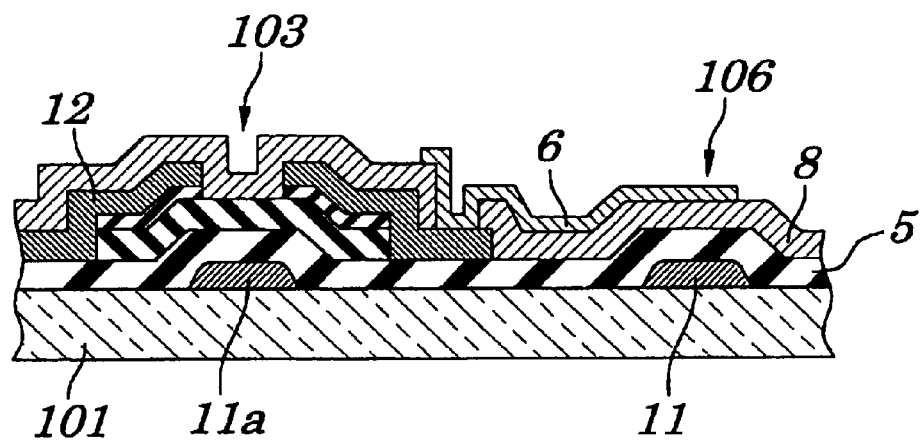

First, as shown in FIG. 24, a plurality of address wiring 11 is formed on a glass insulating substrate 101 in a manner that it is placed in parallel to each other. Each of the address wiring 11 is patterned in a manner that the gate 11a extends in the thin-film transistor section 103 in each picture element area. As shown in FIG. 25, on the whole surface of the insulating substrate 10 on which the address wiring 11 is formed is grown the gate insulating film 5 and further in the thin-film transistor section 103, on the gate insulating film 5 are formed the channel layer 2 and contact layer 7 of the thin-film transistor section 103 which are disposed facing the gate 11a. Next, as depicted in FIG. 26, in the capacitor section 105, on the gate insulating film 5 is formed a through hole 5b which reaches the address wiring 11. Moreover, as shown in FIG. 27, on the gate insulating film 5, a plurality of the data wiring 12, 12, . . . is formed with the Cr metal in a manner that the data wiring 12, 12, . . . and the address wiring 11,11, . . . cross each other and, at the same time, in the capacitor section 105, the first electrode 10 is formed with the same Cr metal as used for the data wiring 12, and the connecting layer 14 and the first electrode 10 are integrally formed in a manner that the connecting layer 14 passes via the through hole 5b of the gate insulating film 5. Then, as depicted in FIG. 28, the upper layer insulating film 8 is grown in a manner that it covers both of the thin-film transistor section 103 and the capacitor section 105 and, in the thin-film transistor section 103, on the upper layer insulating film 8 is formed the through hole 8a which reaches the source electrode 4. Furthermore, as shown in FIG. 29, on the upper layer insulating film 8 is formed the transparent electrode 6 made of ITO. The transparent electrode 6 extends toward the thin-film transistor 103 side and is connected to the source electrode 4 via the through hole 8a and also extends toward the capacitor section 105 side and forms the second electrode 25 which faces the first electrode 10, and these components constitute the TFT array substrate of the ninth embodiment.

In the liquid-crystal display device of the present invention, as described above, since the capacitor section is composed of the first electrode formed on the gate insulating film using the same conductive film as used for the data wiring, of the second electrode formed, using the same transparent conductive film as used for the transparent electrode, on the upper layer insulating film grown on the gate insulating film, the metal film is not exposed, at least, on the capacitor section, thus preventing failures in next processes. Moreover, by selecting the upper layer insulating film, it is possible to readily obtain the capacitor section having large electrostatic capacitance and to improve the aperture ratio in the picture element area.

As described above, according to embodiments of the present invention, since the width of the address wiring in the picture element area is constant and the whole capacitor section is mounted in a manner that it superimpose the address wiring, the whole capacitor section is substantially housed in the black matrix and the aperture ratio can be maximized and, in the light-transmission type, the light-transmission rate is not decreased due to the capacitor section.

According to the present invention, since the whole thin-film transistor section and data wiring are covered with the upper layer insulating film or the transparent conductive film, the whole surface of the image forming section of the TFT array substrate is covered with the upper layer insulating film or the transparent conductive film and therefore various failures that may occur during next processes including the application of polyimide and treatment of orientation can be prevented.

Moreover, according to the present invention, since the liquid-crystal display device is composed of, at least, one type of the silicon nitride film, silicon oxide film and metal oxide film, the capacitor section having large electrostatic capacitance can be obtained by using such materials as generally used as the passivation film for the thin-film transistor.

Furthermore, according to the present invention, since connections are made at, at least, two points between the first electrode and address wiring or between the first electrode and the auxiliary capacitive common wiring, even if any connecting failure occurs at one connection point or even if defect occurs in the address wiring or auxiliary capacitive common wiring, the continuity is ensured, resulting in the improvement in yield and reliability in production processes. Also, wiring resistance in the address wiring and auxiliary capacitive common wiring can be reduced and a delay in transmission of signals can be prevented accordingly.

Also, according to the present invention, since the capacitor section is constructed by connecting, in parallel, the first capacitive component formed between part of the address wiring and the first electrode with the second capacitive component formed between the first electrode and second electrode, electrostatic capacitance can be accumulated on both ends of the first electrode and the electrostatic capacitance per area in the capacitor section can be greatly increased without the exposure of the metal film on the surface.

It is thus apparent that the present invention is not limited to the above embodiments but may be changed and modified without departing from the scope and spirit of the invention.

Finally, the present application claims the priority of Japanese Patent Application No. Hei11-029367 filed on Feb. 5, 1999, which is herein incorporated by reference.

What is claimed is:

1. A liquid-crystal display device comprising:
   a plurality of address wires formed on an insulating substrate;
   a gate insulating film formed on said address wires and on said insulating substrate;
   a plurality of data wires, said data wires crossing said address wires;
   an upper layer insulating film formed on said data wires and on said gate insulating film, said upper layer insulating film having a smaller thickness and higher dielectric constant than the gate insulating film; and
   a picture element area comprising:
      a transparent electrode, comprising a transparent conductive film, formed on said upper layer insulating film and surrounded by said address wires and said data wires;
      a thin-film transistor section for selectively connecting said data wires with said transparent electrode by a gate connected to said address wires; and
      a capacitor section comprising:
         a first electrode formed on said gate insulating film and comprising the same conductive film as in said data wires, and having an innermost portion formed over said address wires;
         a second electrode on said upper layer insulating film and comprising the same transparent conductive film as in said transparent electrode; and
         at least a portion of said upper layer insulating film formed between said first electrode and said second electrode.

2. The liquid-crystal display device according to claim 1, wherein said second electrode comprises an extended part of said transparent electrode.

3. The liquid-crystal display device according to claim 1, wherein said first electrode is connected to said address wires by the same transparent conductive film as used for said transparent electrode.

4. The liquid-crystal display device according to claim 1, wherein said first electrode is connected to said address wires by the same conductive film as in said data wires.

5. The liquid-crystal display device according to claim 1, wherein a part of said capacitor section is superimposed through said gate insulating film on said address wires.

6. The liquid-crystal display device according to claim 1, wherein a width of said address wires is constant in said picture element area and wherein said capacitor section is entirely superimposed through said gate insulating film on said address wires.

7. The liquid-crystal display device according to claim 1, wherein said thin-film transistor section and said data wires are covered with one of said upper layer insulating film and said transparent conductive film.

8. The liquid-crystal display device according to claim 1, wherein one of said upper layer insulating film has a thickness which is less than a thickness of said gate insulating film, and a dielectric constant of said upper layer insulating film is greater than a dielectric constant of said gate insulating film.

9. The liquid-crystal display device according to claim 1, wherein said upper layer insulating film comprises a complex film comprising a plurality of insulating films.

10. The liquid-crystal display device according to claim 1, wherein said upper layer insulating film comprises at least one of a silicon nitride film, silicon oxide film and metal oxide film.

11. The liquid-crystal display device according to claim 1, wherein an auxiliary capacitive common wiring is formed in parallel with said address wires and wherein said capacitor section is one of partially and totally superimposed on said auxiliary capacitive common wiring.

12. The liquid-crystal display device according to claim 11, wherein at least two connections are made between said first electrode and said address wires or between said first electrode and said auxiliary capacitive common wiring.

13. The liquid-crystal display device according to claim 1, wherein said capacitor section is formed by connecting, in parallel, a first capacitive component comprising a part of said address wires, said first electrode and said gate insulating film being located between said address wires and said first electrode with a second capacitive component comprising said first electrode, said second electrode and said upper layer insulating film being located between said first electrode and said second electrode.

14. A method for producing the liquid-crystal display device of claim 1, comprising:
   forming a plurality of address wires on an insulating substrate;
   forming a gate insulating film on said address wiring and on said insulating substrate;
   forming a plurality of data wires on said gate insulating film, so that said data wires and said address wires cross each other;
   forming a thin-film transistor for selectively connecting said data wires with said transparent electrode disposed in each picture element area by a gate connected to said address wires, in each picture element area surrounded by said address wires and data wires;
   forming a first electrode using the same conductive film as used to form said data wires, said first electrode having an innermost portion formed over said address wires;
   forming an upper layer insulating film on said first electrode and on said gate insulating film, said upper layer insulating film having a smaller thickness than the gate insulating film;
   forming a second electrode using the same transparent conductive film as used to form said transparent electrode; and
   forming said capacitor section using said first electrode, said second electrode, and said upper layer insulating film.

15. The method for producing the liquid-crystal display device according to claim 1, wherein said second electrode comprises an extended part of said transparent electrode in said capacitor section.

16. The method for producing the liquid-crystal display device according to claim 14, wherein said first electrode is connected to said address wires by the same transparent conductive film as in said transparent electrode.

17. The method for producing the liquid-crystal display device according to claim 14, wherein said first electrode is connected to said address wires by the same conductive film as in said data wires.

18. A method for producing the liquid-crystal display device of claim 11, comprising:
   forming a plurality of address wires on an insulating substrate;
   forming a plurality of auxiliary capacitive common wires parallel with said address wires;
   forming a gate insulating film on said auxiliary capacitive common wires and on said insulating substrate;

forming a plurality of data wires on said gate insulating film, so that said address wires and data wires cross each other;

forming a thin-film transistor for selectively connecting said data wires with said transparent electrode in each picture element area by a gate connected to said address wires, in each picture element area surrounded by said address wires and data wires;

forming said first electrode using the same conductive film as used to form said data wires, said first electrode having an innermost portion formed over said address wires;

forming said upper insulating film on said first electrode and on said gate insulating film, said upper layer insulating film having a smaller thickness than the gate insulating film;

forming said second electrode using the same transparent conductive film as used to form said transparent electrode; and forming said capacitor section using said first electrode, said second electrode and said upper layer insulating film so that said capacitor is one of partially and totally superimposed on said auxiliary capacitive common wiring.

19. The method for producing a liquid-crystal display device of claim 14, wherein said first electrode is connected to said transparent electrode and said second electrode is connected to said address wires and wherein said capacitor section is mounted so that it is superimposed on a part of said address wires.

20. A method for producing the liquid-crystal display device of claim 4, comprising:

forming a plurality of address wires on an insulating substrate;

forming a gate insulating film on said address wires and on said insulating substrate;

forming, in said gate insulating film, a through hole which extends to said address wires;

forming a plurality of data wires on said gate insulating film so that said address wires and data wires cross each other;

forming a thin-film transistor for selectively connecting said data wires with said transparent electrode in each picture element area by a gate connected to said address wires, in each picture element area surrounded by said address wires and data wires;

forming said first electrode using the same conductive film used to form said data wires, said first electrode having an innermost portion formed over said address wires;

connecting said first electrode to said address wires via said through hole formed in said gate insulating film;

forming said upper layer insulating film on said first electrode and on said gate insulating film, said upper layer insulating film having a smaller thickness than the gate insulating film;

forming said second electrode using the same transparent conductive film used to form said transparent electrode; and forming said capacitor section using said first electrode, said second electrode and said upper layer insulating film.

21. The liquid-crystal display device of claim 13, wherein said first electrode is connected to said transparent electrode and said second electrode is connected to said address wires and wherein said capacitor section is mounted so that it is superimposed on a part of said address wires.

22. A method of fabricating a liquid-crystal display device, said method comprising:

forming a plurality of address wires on an insulating substrate;

forming a gate insulating film on said address wires and on said insulating substrate;

forming a plurality of data wires on said gate insulating film, so that said data wires and said address wires cross each other;

forming a thin-film transistor for selectively connecting said data wires with a transparent electrode by a gate connected to said address wires, said transparent electrode being located in a picture element area surrounded by said address wires and data wires;

forming a first electrode using the same conductive film as used to form said data wires, said first electrode having an innermost portion formed over said address wires;

forming an upper layer insulating film on said first electrode and on said gate insulating film, said upper layer insulating film having a smaller thickness than the gate insulating film;

forming a second electrode using the same transparent conductive film as used to form said transparent electrode; and forming a capacitor section using said first electrode, said second electrode, and said upper layer insulating film.

23. A liquid-crystal display device according to claim 1, wherein, in said capacitor section, said address wires are formed directly on said insulating substrate, and said gate insulating film is formed directly on said address wires.

24. The liquid-crystal display device according to claim 1, wherein, in said capacitor section, said first electrode is formed directly on said gate insulating film, said upper layer insulating film is formed directly on said first electrode, and said second electrode is formed directly on said upper layer insulating film.

25. The liquid-crystal display device according to claim 24, wherein said first electrode comprises said data wires.

26. The liquid-crystal display device according to claim 24, wherein said second electrode comprises said transparent electrode.

27. The liquid-crystal display device according to claim 1, wherein said address wires and said first electrode are separated by a first single layer comprising said gate insulating film, and wherein said first electrode and said second electrode are separated by a second single layer comprising said upper insulating film.

28. The liquid-crystal display device according to claim 22, wherein said forming said gate insulating film comprises forming said gate insulating film directly on said address wires, and said first electrode comprises forming said first electrode directly on said gate insulating film.

29. The liquid-crystal display device according to claim 22, wherein said forming said upper layer insulating film comprises for said upper layer insulating film directly on said first electrode, and said forming said second electrode comprises forming said second electrode directly on said upper layer insulating film.

30. The liquid-crystal display device according to claim 1, further comprising:

a black matrix filter formed on said capacitor section, wherein the capacitor section is superimposed upon said address wires.

31. A liquid-crystal display device, comprising:

a plurality of address wires formed on an insulating substrate;

a gate insulating film formed directly on said address wires and said insulating substrate;

a plurality of data wires formed directly on said gate insulating film, said data wires crossing said address wires;

an upper layer insulating film formed directly on said data wires and on said gate insulating film, said upper layer insulating film having a smaller thickness and higher dielectric constant than the gate insulating film;

a picture element area comprising:
- a transparent electrode, comprising a transparent conductive film, formed directly on said upper layer insulating film and surrounded by said address wires and said data wires;
- a thin-film transistor section for selectively connecting said data wires with said transparent electrode by a gate connected to said address wires; and
- a capacitor section comprising:
    - a first electrode, comprising said data wires, formed directly on said gate insulating film, and having an innermost portion formed over said address wires;
    - a second electrode, comprising said first electrode, formed directly on said upper layer insulating film, wherein said first electrode and said second electrode are separated by a single layer comprising said upper layer insulating film.

32. A method for producing a liquid-crystal display device, comprising:

forming a plurality of address wires on an insulating substrate;

forming a gate insulating film directly on said address wires and said insulating substrate;

forming a plurality of data wires directly on said gate insulating film, said data wires crossing said address wires;

forming an upper layer insulating film directly on said data wires and on said gate insulating film, said upper layer insulating film having a smaller thickness and higher dielectric constant than the gate insulating film;

forming a picture element area comprising:
- forming a transparent electrode, comprising a transparent conductive film, directly on said upper layer insulating film and surrounded by said address wires and said data wires;
- forming a thin-film transistor section for selectively connecting said data wires with said transparent electrode by a gate connected to said address wires;
- forming a capacitor section comprising:
    - forming a first electrode, comprising said data wires, directly on said gate insulating film, said first electrode having an innermost portion formed over said address wires; and
    - forming a second electrode, comprising said transparent electrode, directly on said upper layer insulating film, wherein said first electrode and said second electrode are separated by a single layer comprising said upper layer insulating film.

* * * * *